US011444947B2

(12) United States Patent
Aronson

(10) Patent No.: US 11,444,947 B2
(45) Date of Patent: *Sep. 13, 2022

(54) IDENTITY TESTING MACHINE

(71) Applicant: Jeffry David Aronson, Austin, TX (US)

(72) Inventor: Jeffry David Aronson, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/891,088

(22) Filed: Jun. 3, 2020

(65) Prior Publication Data

US 2020/0296103 A1    Sep. 17, 2020

Related U.S. Application Data

(63) Continuation-in-part of application No. 16/583,257, filed on Sep. 26, 2019, now Pat. No. 10,708,271,
(Continued)

(51) Int. Cl.
*H04L 9/40* (2022.01)
*G06F 21/32* (2013.01)
(Continued)

(52) U.S. Cl.
CPC .............. *H04L 63/10* (2013.01); *G06F 21/32* (2013.01); *G06F 21/40* (2013.01); *G06Q 10/10* (2013.01)

(58) Field of Classification Search
CPC ......... H04L 63/10; G06F 21/32; G06F 21/40; G06Q 10/10
See application file for complete search history.

(56) References Cited

U.S. PATENT DOCUMENTS

2002/0097142 A1* 7/2002 Janiak ............... G06K 9/00006
340/5.53
2007/0150745 A1* 6/2007 Peirce .................... G06F 21/32
713/186
(Continued)

OTHER PUBLICATIONS

Kumar et al., "Using Continuous Biometric Verification to Protect Interactive Login Sessions", Dec. 2005, Annual Computer Security Applications Conference, pp. 1-10 (Year: 2005).*

*Primary Examiner* — Kenneth W Chang
(74) *Attorney, Agent, or Firm* — John A. Fortkort; Fortkort & Houston PC

(57) ABSTRACT

A scalable configurable universal complete spectrum identity testing machine is provided which includes at least one computer that utilizes necessary resources for making identity test determinations as to whether or not one specific sensor-observed tested person is the same person as one specific known person. The at least one computer may be utilized for at least one additional purpose besides being utilized as an identity testing machine. The identity testing machine makes one-time, intermittently performed, or constantly performed determinations of identity regarding any one specific tested person and it is configurable for doing so at any attainable level of accuracy including 100% accuracy. The identity determining machine is configurable for: interacting with itself or utilized cyber resources to perform possible functions, utilizing data representing recognized characteristics for comparing or determining, utilizing observation data, derived data, useful information or outcomes from comparing for making identity determinations, and reporting on its operations.

21 Claims, 3 Drawing Sheets

Related U.S. Application Data which is a continuation-in-part of application No. 15/456,542, filed on Mar. 12, 2017, now Pat. No. 10,462,139, which is a continuation-in-part of application No. 15/071,075, filed on Mar. 15, 2016, now Pat. No. 9,635,025, which is a continuation-in-part of application No. 14/857,445, filed on Sep. 17, 2015, now Pat. No. 9,319,414, which is a continuation-in-part of application No. 14/316,196, filed on Jun. 26, 2014, now Pat. No. 9,166,981, which is a continuation of application No. 13/784,277, filed on Mar. 4, 2013, now Pat. No. 8,769,649, which is a continuation of application No. 13/688,925, filed on Nov. 29, 2012, now Pat. No. 8,434,136.

(51) Int. Cl.
*G06F 21/40* (2013.01)
*G06Q 10/10* (2012.01)

(56) References Cited

U.S. PATENT DOCUMENTS

| | | | |
|---|---|---|---|
| 2008/0040780 A1* | 2/2008 | Reinhold | H04L 63/0861 726/5 |
| 2013/0133055 A1* | 5/2013 | Ali | H04L 63/0861 726/7 |

* cited by examiner

IDENTITY TESTING MACHINE

CROSS REFERENCE TO RELATED APPLICATIONS

This application is a continuation-in-part application of U.S. patent application Ser. No. 16/583,257, filed Sep. 26, 2019, entitled SCALABLE CONFIGURABLE UNIVERSAL FULL SPECTRUM CYBERSPACE IDENTITY VERIFICATION TEST, having the same inventor, now allowed, which is incorporated herein by reference in its entirety; which application is a continuation-in-part application of U.S. patent application Ser. No. 15/456,542, filed Mar. 12, 2017, entitled SCALABLE UNIVERSAL FULL SPECTRUM CYBER DETERMINING PROCESS, having the same inventor, now allowed, which is incorporated herein by reference in its entirety; which application is a continuation-in-part application of U.S. patent application Ser. No. 15/071,075, filed Mar. 15, 2016, issued as U.S. Pat. No. 9,635,025 on Apr. 25, 2017, entitled SCALABLE UNIVERSAL FULL SPECTRUM CYBER DETERMINING MACHINE, having the same inventor, which is incorporated herein by reference in its entirety; which application is a continuation-in-part application of U.S. patent application Ser. No. 14/857,445, filed Sep. 17, 2015, issued as U.S. Pat. No. 9,319,414 on Apr. 19, 2016, entitled SCALABLE FULL SPECTRUM CYBER DETERMINATION PROCESS, having the same inventor, which is incorporated herein by reference in its entirety; which application is a continuation-in-part application of U.S. patent application Ser. No. 14/316,196, filed Jun. 26, 2014, issued as U.S. Pat. No. 9,166,981 on Oct. 20, 2015, entitled FULL SPECTRUM CYBER IDENTIFICATION DETERMINATION PROCESS, having the same inventor, which is incorporated herein by reference in its entirety; which application is a continuation of U.S. patent application Ser. No. 13/784,277, filed Mar. 4, 2013, issued as U.S. Pat. No. 8,769,649 on Jul. 1, 2014, entitled FULL SPECTRUM CYBER IDENTIFICATION DETERMINATION PROCESS, having the same inventor, which is incorporated herein by reference in its entirety; which application is a continuation of U.S. patent application Ser. No. 13/688,925, filed Nov. 29, 2012, issued as U.S. Pat. No. 8,434,136 on Apr. 30, 2013, entitled FULL SPECTRUM CYBER IDENTIFICATION DETERMINATION PROCESS, having the same inventor, which is incorporated herein by reference in its entirety.

FIELD OF THE DISCLOSURE

The present disclosure relates generally to a scalable configurable universal complete spectrum identity testing machine that utilizes a unique identity test dataset for one specific known person to make at least one identity test determination regarding any one specific tested person. The present disclosure more particularly relates to at least one computer that is configured to be utilized, at least in part, for testing the identity of one specific person, utilizing a file or files containing data that represent the unique cyberspace identity or identifiers for any selected one specific known person. The identity testing machine utilizes the unique cyberspace identifiers for at least one specific known person to test the identity of any one specific tested person. The identity testing machine does so utilizing predetermined criteria, cyber resources and sensor data or derived data regarding at least one specific known person and one specific tested person. Wherein the at least one specific known person is selected from the spectrum of people who have unique cyberspace identity test datasets, and the at least one specific tested person is selected from the spectrum of people whose identities have been tested by an identity testing machine.

BACKGROUND OF THE DISCLOSURE

Cybersecurity is the protection of cyber resources, including the hardware, the software and the information stored in the hardware or software, from theft or malicious damage thereto. Cybersecurity typically entails controlling access to cyber resources in order to prevent malicious disruption or misdirection of the services or of the information those cyber resources provide.

Cybersecurity has become increasingly important as the world has become increasingly reliant on cyber resources. Moreover, with the advent of the Internet of Things (IoT), networks have become increasingly complex. Hence, in addition to various types of personal computers and smart phones, networks have come to include almost any device which can be embedded with electronics, programming, sensors and network connectivity. The increasing importance of cyber systems has made cybersecurity more critical, while the increasing complexity of cyber systems has made cybersecurity increasingly challenging. Together, these factors have made existing cybersecurity measures increasingly inadequate.

At the heart of most cybersecurity failures is the complete inability of computers and cyber resources to accurately determine the identity of any one specific person prior to allowing the specific person to gain access to cyber resources. Utilizing identity testing is an indispensable part of putting an end to the security failures that now plague cyberspace.

SUMMARY OF THE DISCLOSURE

Unless otherwise specified herein, throughout this entire disclosure, use of the singular form of any word, phrase or statement indicates either the singular or the plural form of the word, phrase or statement, and use of the plural form of any word, phrase or statement indicates either the singular or the plural form of the word, phrase or statement. Additionally, the term "or" shall be construed as the logically inclusive "or". Hence, the statement "A or B" shall be true if: (a) only A is true, (b) only B is true, or (c) both A and B are true; the notation "A and/or B" explicitly refers to the logically inclusive "or".

In one aspect is scalable configurable universal complete spectrum identity testing machine, the identity testing machine is comprised of at least one computing device, wherein the at least one computing device utilizes:
  (a) at least one sensor observation,
  (b) criteria selected from the spectrum of criteria that may be utilized by the identity testing machine,
  (c) selected useful information,
  (d) selected necessary programming, and
  (e) any other necessary resources,
all of which are configured and utilized for making at least one identity test determination regarding any one specific tested person;
  wherein the identity testing machine utilizes all or part of the resources of the at the least one computing device;
  wherein the identity testing machine is configurable and may be configured for utilization in at least one configuration;

wherein the identity testing machine's identity tests are selected from the spectrum of identity tests that utilize sensor observations of a person in the making of determinations regarding the identity of any one specific tested person;

wherein the any one specific tested person is selected from the spectrum of people who have been tested;

wherein the any other necessary resources are selected from the spectrum of other resources that may be necessary for the identity testing machine to utilize;

wherein the identity testing machine is utilizable under at least one observation circumstance selected from the spectrum of sensor observation circumstances;

wherein the identity testing machine is utilized for at least one purpose selected from the spectrum of purposes for which identity testing machines may be utilized;

wherein the necessary programming is selected from the spectrum of programming that may be necessary for the identity testing machine to utilize;

wherein the identity testing machine utilizes useful information from at least one point in time or from over at least one period of time;

wherein the useful information is selected from the spectrum of information that may be utilized by the identity testing machine;

wherein the spectrum of useful information includes information that was from, or was derived from, at least one sensor observation;

wherein the at least one sensor observation provides useful information regarding at least one aspect of: (1) at least one sensor observation, (2) at least one specific known person, or (3) at least one specific tested person;

wherein at least one identity test determination regarding one specific tested person is selected from the spectrum of identity test determinations regarding any one specific tested person;

wherein the any one specific tested person is one specific subject of at least one identity test sensor observation;

wherein at least one aspect of one specific known person or one specific tested person is selected from the spectrum of sensor observable aspects of people;

wherein the identity testing machine utilizes at least one observed characteristic regarding the at least one aspect of the one specific known person, or the one specific tested person in the making of at least one identity test determination;

wherein the at least one observed characteristic is selected from the spectrum of sensor observable characteristics of people who are subjects of identity test sensor observations;

wherein the identity testing machine is configurable for utilizing at least one type of sensor observation selected from the group consisting of: (a) visual sensor observations, (b) audible sensor observations, (c) thermal sensor observations, (d) olfactory sensor observations, (e) tactile sensor observations, (f) chemical sensor observations, or (g) any other types of sensor observations that may be utilized by the identity testing machine;

wherein the least one sensor observation has at least one characteristic that is utilizable by the identity testing machine in the making of at least one identity test determination;

wherein the at least one characteristic is selected from the spectrum of characteristics of sensor observations that may be utilized by the identity testing machine;

wherein the identity testing machine is scalable in regard to included or utilized resources, wherein its included or utilized resources fall at one point in a range of from a minimum to a maximum;

wherein at the minimum the identity testing machine includes or utilizes only the resources that are necessary for providing for the least complex, in regard to included or utilized resources, of all identity testing machine needs for included or utilized resources; and wherein at the maximum the identity testing machine test includes or utilizes all of the necessary resources for providing for the making of the most complex, in regard to included or utilized resources, of all identity testing machine needs for included or utilized resources;

wherein the identity testing machine is configurable for determining or utilizing at least one measure of adequacy of available resources;

wherein the identity testing machine is configurable for determining or utilizing at least one measure of adequacy of available useful information;

wherein the identity testing machine is configurable for determining or utilizing at least one measure of accuracy of at least one identity test determination;

wherein the identity testing machine is configurable for making at least one type of identity test determinations selected from the group consisting of: (1) single-event identity test determinations, (2) intermittently made identity test determinations, or (3) constantly made identity test determinations, regarding any one specific tested person;

wherein the identity testing machine is configurable for testing the identity of any one specific tested person in real time or at any time thereafter; or wherein the identity testing machine is further configurable for utilizing at least one part of at least one step selected from the group consisting of:

(a) a first series observation step, wherein the identity testing machine utilizes at least one sensor observation;

wherein one specific known person is one specific subject of the at least one sensor observation;

wherein the one specific known person has at least one specific sensor observable aspect;

wherein the identity testing machine recognizes at least one characteristic regarding the at least one specific aspect;

wherein the at least one recognized characteristic is utilizable by the identity testing machine in the making of at least one identity test determination regarding the one specific known person;

wherein the identity testing machine utilizes at least one designation from the at least one sensor observation or assigns at least one designation representing:

(i) the at least one sensor observation, (ii) the at least one sensor observed aspect of the one specific known person, or (iii) the at least one sensor observed characteristic regarding at least one observed aspect;

wherein the identity testing machine includes the at least one designation, as data, in at least one first series observation record of the one specific known person;

(b) a second series observation step, wherein the identity testing machine utilizes at least one sensor observation;

wherein one specific tested person is one specific subject of the at least one sensor observation;

wherein the one specific tested person has at least one specific sensor observable aspect;

wherein the identity testing machine recognizes at least one characteristic regarding the at least one specific aspect;

wherein the at least one recognized characteristic is utilizable by the identity testing machine in the making of at least one identity test determination regarding the one specific tested person;

wherein the identity testing machine utilizes at least one designation from the at least one sensor observation or assigns at least one designation representing:
  (i) the at least one sensor observation,
  (ii) the at least one sensor observed aspect of the one specific tested person, or
  (iii) the at least one characteristic regarding the at least one sensor observed aspect;

wherein the identity testing machine includes at least one designation, as data, in at least one second series observation record of the one specific tested person;

(c) a processing step, wherein at least one designation from said at least one first series observation record or at least one designation from said at least one second series observation record are stored or utilized as data;

wherein at least part of the data from the at least one first series observation step or the at least one second series observation step is processed utilizing at least one method, process, procedure or formula;

wherein the at least one method, process, procedure or formula is selected from the spectrum of methods, processes, procedures or formulas that may be utilized in the processing of observation data or derived data from first series observation steps or second series observation steps;

wherein the processing of the observation data or derived data results in the creation of derived data;

wherein the observation data or the derived data is utilizable for at least one purpose selected from the spectrum of purposes for which observation data or derived data may be utilized by the identity testing machine;

wherein the at least one purpose includes utilizing the observation data or the derived data in the making of at least one identity test determination regarding any one specific tested person;

wherein at least one part of the observation data or the derived data is utilizable by the identity testing machine in at least one part of at least one step selected from the group consisting of: (i) at least one processing step, (ii) at least one matching step, (iii) at least one comparing step, or (iv) at least one determining step;

(d) a matching step, wherein the identity testing machine matches the observation data or the derived data from at least one second series observation record of one specific tested person with comparable observation data or derived data from at least one first series observation record of one specific known person;

(e) a comparing step, wherein the identity testing machine compares observation data or derived data from at least one second series observation record of one specific tested person with comparable observation data or derived data from at least one first series observation record of one specific known person and provides at least one conclusion from the comparing;

(f) a determining step, wherein the identity testing machine utilizes at least one member selected from the group consisting of:
  (i) at least one part of at least one conclusion from at least one comparing step,
  (ii) at least one part of the observation data,
  (iii) at least one part of the derived data, or
  (iv) selected useful information;
  in the making of at least one identity test determination; or (g) a reporting step wherein the identity testing machine provides at least one report regarding at least one part of at least one cycle of utilization of the identity testing machine.

In some embodiments the identity testing machine is configurable for utilizing at least one part of the observation data or the derived data from at least one first series observation record of one specific known person as the one specific known person's cyberspace identity or identifiers, wherein the one specific known person's cyberspace identity or identifiers are unique to the one specific known person; and wherein at least one part of the observation data or the derived data from at least one first series observation record for any other one specific known person is utilizable as the cyberspace identity or identifiers for the any other one specific known person and the cyberspace identity or identifiers are unique to each one specific other known person.

In some embodiments the identity testing machine is configurable for achieving at least one selected attainable percentage of accuracy goal for at least one identity test determination; and wherein the at least one attainable percentage of accuracy goal falls within a range extending from 0% accuracy up to, and including, 100% accuracy.

In some embodiments the identity testing machine is configurable for utilizing any possible level of observation participation by any one specific tested person or any one specific known person;

wherein the any one specific tested person or the any one specific known person are each one specific identity test sensor observation subject; and wherein the any possible level of observation participation ranges from the one specific tested person or the one specific known person being sensor observable but not being consciously or otherwise engaged in at least one identity test sensor observation, to the one specific tested person or the one specific known person being an active and consciously engaged participant in at least one identity test sensor observation.

In some embodiments of the identity testing machine at least one sensor observation occurs over at least one period of time and the at least one sensor observation includes at least one observed change that occurs over the at least one period of time to at least one member selected from the group consisting of: (a) at least one observable aspect of the sensor observation, (b) at least one observable aspect of any one specific known person who is one specific first series observation subject, or (c) at least one observable aspect of any one specific tested person who is one specific second series observation subject;

wherein the identity testing machine is configurable for utilizing the at least one observed change that occur over the at least one period of time in the making of at least one identity test determination.

In some embodiments of the identity testing machine one observed change that occurs over at least one period of time includes at least one change to at least one aspect of at least one feature of one specific person, and wherein the at least one feature of the one specific person is selected from the group consisting of the one specific person's: head, face, mouth, eyes, eyebrows, nose, arms, hands, fingers, legs, feet, neck, torso, skin, heart, stomach, intestines, liver, kidneys, lungs, respiration, breath, vascular system, brain, spinal cord, neural system, skeleton, blood, or any other feature of any one specific person selected from the spectrum of features of a people where sensor observable changes occur over time.

In some embodiments of the identity testing machine all or part of the observation data or the derived data from the at least one first series observation record of the one specific known person or the at least one second series observation record of the one specific tested person are included as a part of the spectrum of useful information.

In some embodiments of the identity testing machine the at least one identity test determination includes at least one determination of any indicated percentage of probability that exists of one specific tested person being the same person as one specific known person;

wherein the at least one identity test determination ranges from determining that a 0% probability exists of the one specific tested person being the one specific known person, through determining any intermediate indicated percentage of probability that exists of the one specific tested person being the one specific known person, to determining there is a 100% probability that the one specific tested person absolutely is the one specific known person.

In some embodiments the identity testing machine further includes a repeating step, wherein the identity testing machine selects at least one part of at least one first series observation of one specific known person for repetition by one specific tested subject of at least one identity test sensor observation;

wherein the one specific tested subject of the identity test sensor observation is sensor observed performing the at least one repetition;

wherein the identity testing machine utilizes at least one designation from the repetition observation or assigns at least one designation representing: (a) the at least one sensor observation, (b) the at least one repetition, (c) at least one observable aspect of the one specific tested subject, or (d) at least one characteristic regarding the at least one sensor-observable aspect of the one specific tested subject; and wherein the identity testing machine includes the at least one designation in at least one second series observation record of the repetition.

In some embodiments the identity testing machine is further configured for searching and utilizing available first series observation records of at least one specific known person until either every selected identity testing machine determination for the one specific tested person has been completed, or there are no further comparable first series observation records to search or utilize.

In some embodiments the identity testing machine utilizes useful information from at least one source other than at least one member selected from the group consisting of: (a) at least one first series observation record of any one specific known person, or (b) at least one second series observation record of any one specific tested person.

In some embodiments the identity testing machine utilizes selected criteria, selected useful information, selected programming, and any other necessary resources for the purpose of making identity test determinations that are utilized, at least in part, to determine whether to grant, or to deny, one specific tested person, who is the one specific tested subject of at least one identity test sensor observation, access to at least one part of at least one resource selected from the group consisting of: (a) the identity testing machine, (b) at least one resource that is being utilized by the identity testing machine, or (c) at least one resource that is utilizing the identity testing machine.

In some embodiments the identity testing machine manipulates, in any way possible, at least one operation of at least one member selected from the group consisting of: (a) resources that are being utilized by the identity testing machine, or (b) the identity testing machine itself;

wherein the manipulating provides the identity testing machine with selection of possible utilizations;

wherein the manipulating is utilized for at least one purpose;

wherein the at least one purpose for utilizing the manipulating includes aiding in achieving at least one selected identity test determination goal.

In some embodiments the identity testing machine further includes identity testing machine history, wherein the history includes at least one history record of or from the operations of the identity testing machine.

In some embodiments of the identity testing machine at least one part of at least one observation record for one specific known person that was derived from at least one source other than at least one first series observation step is included as at least one part of at least one first series observation record for the one specific known person.

In some embodiments of the identity testing machine at least one part of at least one observation record for one specific tested person that was derived from at least one source other than at least one second series observation step is included as at least one part of at least one second series observation record for the one specific tested person.

In some embodiments of the identity testing machine the operations of the identity testing machine, or any part thereof, are performed in any useable order.

In some embodiments the identity testing machine includes at least one standard identity testing machine designation representing at least one part of at least one aspect of at least one operation of the identity testing machine.

In some embodiments the identity testing machine is configurable: (a) for being utilized for at least one purpose in addition to being utilized as an identity testing machine, (b) for being utilized as one or more types of devices in addition to being utilized as an identity testing machine device, (c) as a single self-contained identity testing machine, (d) to include utilization of more than one interconnected resource, (e) for being utilized as an integral or remote resource of a device or system, (f) for utilizing all or part of the resources of at least one other device or system, (g) as a virtual device or a physical device or a combination thereof, (h) for being a stationary device or a mobile device or a combination thereof, (i) for being utilized by one or more devices that are located in one or more locations, (j) for utilizing resources that are interconnected in any way, or (k) any combination thereof.

In another aspect is a scalable, configurable, universal, complete spectrum identity testing machine, wherein the identity testing machine is comprised of at least one computing device and the at least one computing device utilizes: criteria that may be utilized by the identity testing machine, selected useful information, and any necessary programming or resources in the making of at least one identity test determination;

wherein the identity testing machine utilizes all or part of the resources of the at least one computing device;

wherein the at least one computing device is configurable for being utilized for at least one purpose in addition to being utilized as an identity testing machine;

wherein the at least one additional purpose is selected from the spectrum of additional purposes for which computing devices of identity testing machines may be utilized;

wherein the identity testing machine makes identity test determination selected from the group consisting of: (i)

one-time single event identity test determinations, (ii) intermittently made identity test determinations, or (iii) constantly made identity test determinations;

wherein the identity testing machine utilizes useful information from at least one point in time or from over at least one period of time;

wherein the useful information is from a spectrum of information that includes at least one observed characteristic of one specific person who is one specific subject of at least one identity test sensor observation;

wherein the at least one identity test sensor observation is a type of sensor observation selected from the group consisting of: (a) visual sensor observations, (b) audible sensor observations, (c) thermal sensor observations, (d) olfactory sensor observations, (e) tactile sensor observations, (f) chemical sensor observations, or (g) any other type of sensor observations that may be utilized be the identity testing machine;

wherein at least one identity test determination is utilized for at least one purpose selected from the spectrum of purposes for which identity test determinations may be utilized;

wherein the identity testing machine is further comprised of utilizing at least one part of at least one step selected from the group consisting of:

(a) a first series observation step utilizing at least one sensor observation;

wherein at least specific known person who is one specific subject of at least one sensor observation has at least one sensor observable aspect;

wherein the identity testing machine recognizes at least one characteristic regarding at least one observed aspect;

wherein the at least one recognized characteristic is utilizable by the identity testing machine in the making of at least one identity test determination;

wherein the identity testing machine utilizes at least one designation from the at least one sensor observation or assigns at least one designation representing at least one member selected from the group consisting of: (i) the at least one sensor observation, (ii) the at least one observed aspect of the one specific known person, or (iii) the at least one recognized characteristic;

wherein the identity testing machine includes at least one of the designations, as data, in at least one first series observation record of the one specific known person;

(b) a second series observation step utilizing at least one sensor observation;

wherein one specific tested person who is one specific tested subject of at least one sensor observation has at least one sensor observable aspect;

wherein the identity testing machine recognizes at least one characteristic regarding at least one observed aspect;

wherein the at least one recognized characteristic is utilizable by the identity testing machine in the making of at least one identity test determination;

wherein, the identity testing machine utilizes at least one designation from the at least one sensor observation or assigns at least one designation representing: (i) the at least one sensor observation, (ii) the at least one observed aspect regarding the one specific tested person, or (iii) the at least one characteristic regarding the at least one aspect;

wherein the identity testing machine includes at least one of the designations, as data, in at least one second series observation record of the one specific tested person;

(c) a processing step, wherein at least one designation from the at least one first series observation record or at least one designation from the at least one second series observation record are stored or utilized as data;

wherein at least one part of the observation data or at least one part of any derived data may be processed in at least one way;

wherein the at least one way is selected from the spectrum of ways that observation data or derived data may be processed for utilization by the identity testing machine;

wherein the processing of the observation data or the derived data results in the creation of derived data;

wherein the observation data or the derived data are utilizable for at least one purpose selected from the spectrum of purposes that observation data or derived data may be utilized;

wherein the at least one purpose includes being utilized by the identity testing machine in the making of at least one identity test determination;

wherein at least one part of the observation data or the derived data is included as at least one part of the useful information;

and wherein at least one part of the observation data or the derived data is utilized by the identity testing machine during at least one part of at least one step selected from the group consisting of: (i) at least one processing step, (ii) at least one matching step, (iii) at least one comparing step, or (iv) at least one determining step;

(d) a matching step matching observation data or derived data regarding one specific tested person who is one specific tested subject of at least one second series observation with comparable observation data or derived data from at least one first series observation record of one specific known person;

(e) a comparing step comparing observation data or derived data from at least one second series observation record of one specific tested person with observation data or derived data from at least one comparable first series observation record of one specific known person, and providing at least one conclusion from the comparing;

(f) a determining step, wherein the identity testing machine utilizes at least one member selected from the group consisting of: (i) at least one conclusion from the at least one comparing step, (ii) observation data or derived data from the first series observation records of one specific known person and observation data or derived data from the second series observation records of the one specific tested person, or (iii) useful information, in the making of at least one identity test determination; or (g) a reporting step making at least one selected report regarding or utilizing at least one part of at least one cycle of utilization of the identity testing machine.

In yet another aspect is a machine for performing at least one identity test on at least one person who is a subject of an identity test sensor observation, wherein the identity testing machine is comprised of at least one computing device, wherein the at least one computing device utilizes: (a) at least one sensor, (b) criteria selected from the spectrum of criteria that may be utilized by the identity testing machine, (c) selected useful information, (d) selected necessary programming, and (e) any other necessary resource, all of which are configured and utilized for the performing of at least one identity test on at least one tested person who is a subject of a second series identity test sensor observation;

wherein the identity testing machine utilizes all or part of the resources of the at least one computing device;

wherein the identity testing machine is configurable for utilizing the at least one computing device for at least one purpose in addition to the purpose of utilizing the at least one computing device as an identity testing machine;

wherein the at least one additional purpose is selected from the spectrum of additional purposes for which computing devices of identity testing machines may be utilized;

wherein the at least one identity test is selected from the spectrum of identity tests that use sensor observations in the making of identity test determinations regarding any one specific tested person;

wherein the at least one specific tested person is selected from the group consisting of the spectrum of people who are tested subjects of identity test sensor observations;

wherein the any other necessary resources are selected from the spectrum of other resources that may be necessary for the identity testing machine to utilize;

wherein the identity testing machine is utilizable under at least one identity test circumstance selected from the spectrum of identity test circumstances;

wherein the identity testing machine is utilizable for at least one purpose selected from the spectrum of purposes for which identity testing machines may be utilized;

wherein the necessary programming is selected from the spectrum of programming that may be necessary for the identity testing machine to utilize;

wherein the identity testing machine utilizes useful information from at least one point in time or from over at least one period of time;

wherein the useful information is selected from the spectrum of information that may be utilized by the identity testing machine;

wherein the spectrum of useful information includes information that was from, or was derived from, at least one sensor observation;

wherein the at least one sensor observation provides useful information regarding at least one aspect of: (a) the at least one sensor observation, (b) one specific known person, or (c) one specific tested person;

wherein the one specific known person or the one specific tested person are each one specific subject of at least one identity test sensor observation;

wherein at least one identity test determination regarding one specific tested person is selected from the spectrum of identity test determinations regarding any one specific tested person;

wherein the at least one aspect of the one specific known person or the one specific tested person is selected from the spectrum of sensor observable aspects of people who are subjects of identity test sensor observations;

wherein the identity testing machine utilizes at least one observed characteristic of the at least one aspect of the one specific known person, or the one specific tested person in the making of at least one identity test determination;

wherein the at least one observed characteristic is selected from the spectrum of sensor observable characteristics of people who are subjects of identity test sensor observations;

wherein the identity testing machine utilizes at least one type of sensor observation selected from the group consisting of: (a) visual sensor observations, (b) audible sensor observations, (c) thermal sensor observations, (d) olfactory sensor observations, (e) tactile sensor observations, (0 chemical sensor observations, or (g) any other types of sensor observations that may be utilized by the identity testing machine;

wherein at least one sensor observation has at least one characteristic that is utilizable by the identity testing machine;

wherein the at least one characteristic is selected from the spectrum of characteristics of sensor observations that may be utilized by the identity testing machine;

wherein the identity testing machine is scalable in regard to included necessary resources;

wherein the identity testing machine's included necessary resources fall at one point in a range of from a minimum to a maximum;

wherein at the minimum the identity testing machine includes only the resources that are necessary for providing for the least complex, in regard to included necessary resources, of all identity testing machine needs for resources; and wherein at the maximum the identity testing machine includes all of the resources that are needed to provide for the most complex, in regard to included necessary resources, of all identity testing machine needs for resources;

wherein the identity testing machine is configurable for determining or utilizing at least one measure of adequacy of available resources;

wherein the identity testing machine is configurable for determining or utilizing at least one measure of adequacy of available useful information;

wherein the identity testing machine is configurable for determining or utilizing at least one measure of accuracy for at least one identity test determination;

wherein the identity testing machine makes at least one type of identity test determination selected from the group consisting of: (a) one-time single event identity test determinations, (b) intermittently made identity test determinations, or (c) constantly made identity test determinations;

regarding any one specific tested person;

wherein the identity testing machine is configurable for testing or verifying the identity of any one specific tested person in real time or at any time thereafter; and wherein the identity testing machine is further configured for utilizing at least one part of at least one step selected from the group consisting of:

(a) a first series observation step, wherein the identity testing machine utilizes at least one sensor observation;

wherein one specific known person is one specific subject of the at least one sensor observation;

wherein the one specific known person has at least one specific sensor observable aspect;

wherein the identity testing machine recognizes at least one characteristic regarding the at least one specific aspect;

wherein the at least one recognized characteristic is utilizable by the identity testing machine in the making of at least one identity test determination regarding the one specific known person;

wherein the identity testing machine utilizes at least one designation from the at least one sensor observation or assigns at least one designation representing:

(i) the at least one sensor observation, (ii) the at least one sensor observed aspect of the one specific known person, or (iii) the at least one sensor observed characteristic regarding the at least one specific observed aspect;

wherein the identity testing machine includes the at least one designation, as data, in at least one first series observation record of the one specific known person;

(b) a second series observation step, wherein the identity testing machine utilizes at least one sensor observation;

wherein one specific tested person is one specific subject of the at least one sensor observation;

wherein the one specific tested person has at least one specific sensor observable aspect;

wherein the identity testing machine recognizes at least one characteristic regarding the at least one specific aspect;

wherein the at least one recognized characteristic is utilizable by the identity testing machine in the making of at least one identity test determination regarding the one specific tested person;

wherein the identity testing machine utilizes at least one designation from the at least one sensor observation or assigns at least one designation representing:
  (i) the at least one sensor observation,
  (ii) the at least one sensor observed aspect of the one specific tested person, or
  (iii) the at least one characteristic regarding the at least one sensor observed aspect;

wherein the identity testing machine includes the at least one designation, as data, in at least one second series observation record of the one specific tested person;

(c) a processing step, wherein derived data or at least one part of the data representing at least one designation from the at least one first series observation step or the at least one second series observation step is processed in at least one way;

wherein the at least one way is selected from the spectrum of ways derived data or observation data from first series observation steps or second series observation steps may be processed for utilization by the identity testing machine;

wherein the processing of the observation data or the derived data results in the creation of derived data;

wherein the observation data or the derived data is utilizable for at least one purpose selected from the spectrum of purposes that observation data or derived data may be utilized by the identity testing machine;

wherein the at least one purpose includes utilization of the observation data or the derived data by the identity testing machine in the making of at least one identity test determination regarding any one specific tested person;

wherein at least one part of the observation data or the derived data may be utilized by the identity testing machine in at least one part of at least one step selected from the group consisting of: (i) at least one processing step, (ii) at least one matching step, (iii) at least one comparing step, or (iv) at least one determining step;

(d) a matching step, wherein the identity testing machine matches observation data or derived data from at least one second series observation record of one specific tested person with comparable observation data or derived data from at least one first series observation record of one specific known person;

(e) a comparing step, wherein the identity testing machine compares observation data or derived data from at least one second series observation record of one specific tested person with comparable observation data or derived data from at least one first series observation record of one specific known person and provides at least one conclusion from the comparing;

(f) a determining step, wherein the identity testing machine utilizes at least one member selected from the group consisting of:
  (i) at least one part of at least one conclusion from at least one comparing step,
  (ii) at least one part of the observation data,
  (iii) at least one part of the derived data, or
  (iv) selected useful information;
in the making of at least one identity test determination; or (g) a reporting step, wherein the identity testing machine makes at least one report regarding at least one part of at least one cycle of utilization of the identity testing machine.

DETAILED DESCRIPTION

Figure 1:
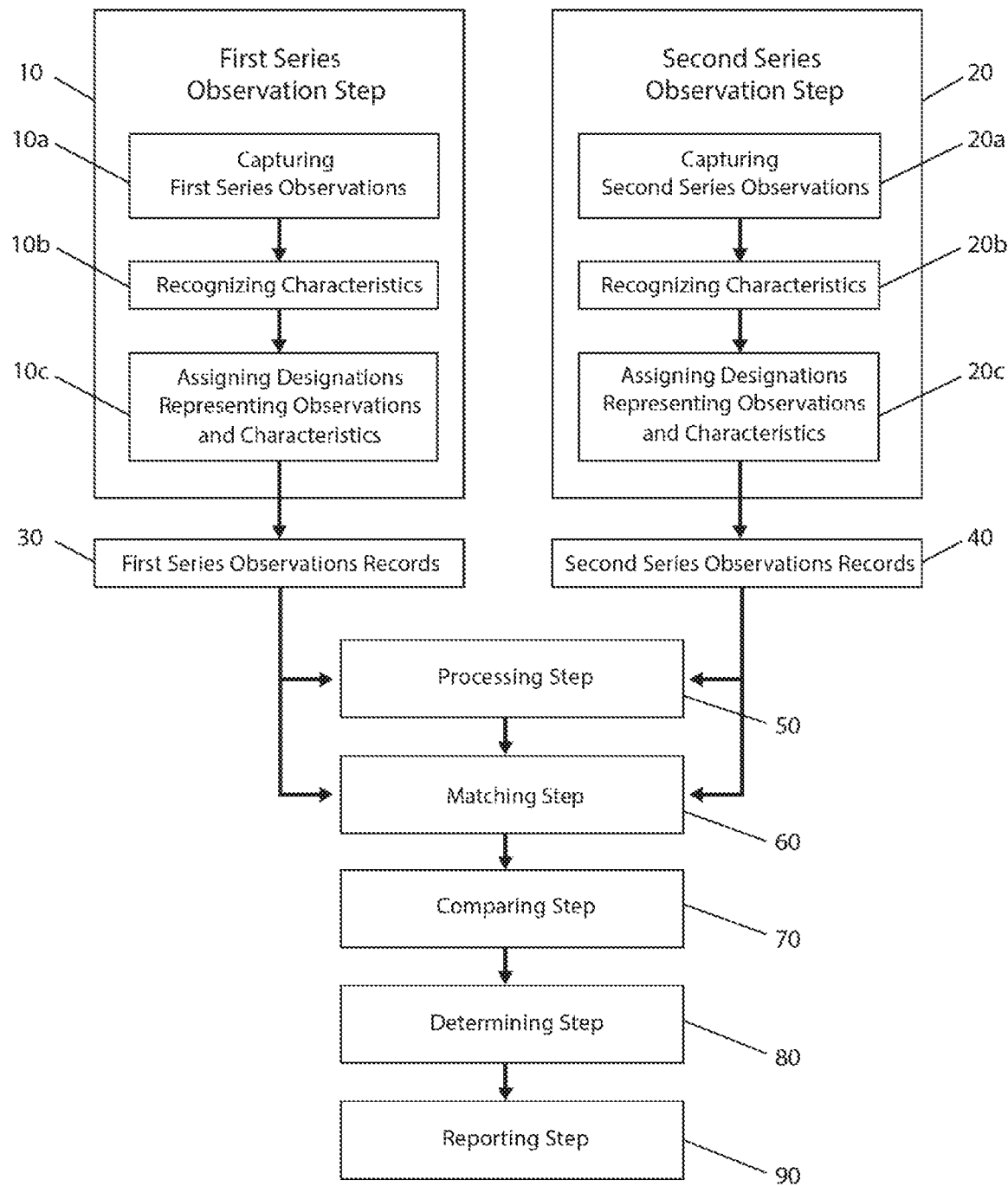
FIG. 1 is a flowchart which illustrates a particular, non-limiting embodiment of the operations of the identity testing machine disclosed herein.

We live in a technologically interconnected world where the vast spectrum of available cyber resources is ever widening. Over time, our technologically interconnected world appears to be destined to provide every possible cyber resource that humanity could ever want or need. Included in those cyber resources, and in accordance with the teachings herein, will be a scalable configurable universal complete spectrum identity testing machine that will be capable of making and utilizing the presently needed constantly provided 100% accurate identity test determinations regarding any one specific person. A further discussion of this universal concept is disclosed in U.S. patent application Ser. No. 16/891,080, Filed Jun. 3, 2020, entitled "Concise Datasets Platform", now pending, having the same inventor, and which is incorporated herein by reference in its entirety; U.S. patent application Ser. No. 15/981,785, filed May 16, 2018, entitled "Scalable Configurable Universal Full Spectrum Cyber Process That Utilizes Measure Points From Sensor Observation-Derived Representations Or Analytically Rich Sparse Data Sets For Making Cyber Determinations Regarding Or Utilizing Sensor Observations Or Sensor Observations Subjects", now pending, having the same inventor, and which is incorporated herein by reference in its entirety; U.S. patent application Ser. No. 15/483,970, filed on Aug. 12, 2016, now pending, entitled "Scalable Configurable Universal Operating System", having the same inventor, and which is incorporated herein by reference in its entirety; which application is a continuation-in-part application of U.S. patent application Ser. No. 15/236,337, filed on Aug. 12, 2016, issued as U.S. Pat. No. 9,660,996 on May 23, 2017, entitled "Point-of-Cyber-Access Cyber System", having the same inventor, and which is incorporated herein by reference in its entirety; which application is a continuation-in-part application of U.S. patent application Ser. No. 14/447,283 filed on Jul. 30, 2014, issued as U.S. Pat. No. 9,479,507 on Oct. 25, 2016, entitled "Single-Point-of-Access Cyber System", having the same inventor, and which is incorporated herein by reference in its entirety; which application is a continuation application of U.S. patent application Ser. No. 13/702,537 filed on Oct. 19, 2011, issued as U.S. Pat. No. 8,832,794 on Sep. 9, 2014, entitled "Single-Point-of-Access Cyber System", having the same inventor, and which is incorporated herein by reference in its entirety.

In light of the foregoing, there presently is an unanswered need in the art for an identity testing machine that:

makes identity test determinations regarding whether or not one specific known person and one specific tested person are the same person at any attainable level of accuracy, including 100% accuracy;

utilizes any number of observed characteristics of one specific known person or one specific tested person in the making of identity test determinations regarding any one specific tested person;

utilizes observations of any one specific tested person who is not consciously engaged in the identity test of the one specific tested person;

makes one-time single event identity test determinations regarding any one specific tested person, intermittently made identity test determinations regarding any one specific tested person, or constantly made identity test determinations regarding any one specific tested person;

utilizes observations where a tested person repeats a portion of a selected, previously captured sensor observation of a known person;

utilizes any available useful sensor observation in the making of identity test determinations;

utilizes any number of observed characteristics of any one specific known person who is one specific subject of an identity test sensor observation, or any one specific tested person who is one specific subject of an identity test observation, in the making of identity test determinations;

provides or utilizes standard designations for accurately or consistently representing any aspect of the operations of the identity testing machine;

enables absolute security or privacy for any information or resources: (a) that are utilized by the identity testing machine, or (b) that are utilizing the identity testing machine;

utilizes any useful criteria for observing, recognizing, matching, comparing, processing of observation data, processing of derived data, determining, reporting, or, any other operations of the making of identity test determinations;

utilizes observations that were not captured or processed by the identity testing machine in the making of identity test determinations;

utilizes useful information of any type from one or more sources in the making of identity test determinations;

utilizes at least one recognized characteristic in the making of identity test determinations;

utilizes comparisons of at least one matching characteristic to achieve a predetermined attainable identity test determination goal; or is scalable in regard to included utilized necessary resources, to fall at any one point in a range of from a minimum to a maximum, wherein at the minimum the identity testing machine includes or utilizes only the resources that are necessary for the making of the least complex (with respect to included or utilized necessary resources) of all identity testing machine needs for included or utilized necessary resources, and wherein at the maximum the identity testing machine includes or utilizes, all of the resource that are necessary for providing for the most complex of all identity testing machine needs for necessary resources.

A technologically interconnected world that is capable of providing every possible cyber resource humanity could ever want or need can only be built upon the foundation of a secure and safe cyberspace environment or cyberspace ecosystem. Constant real time utilization of accurate and reliable identity test determinations regarding any one specific tested person are an indispensable step in providing a secure and safe cyberspace environment and cyberspace ecosystem.

Therefore, there is a need in the art for a scalable configurable universal complete spectrum identity testing machine that can be configured to constantly make 100% accurate determinations regarding the identity of any one specific person.

The foregoing needs, and other needs may be met with the process, procedures, systems and methodologies disclosed herein.

Definitions

The following terms, as used in the present disclosure, have the meanings indicated.

Absolutely unique: occurring at a ratio of one to the total (non-zero) number of first series observation records.

Biological characteristic: any biological characteristic of one specific person that can be sensor-observed and reported upon.

Unique biological characteristic: any single observable biological characteristic of one specific person, or any combination of observable biological characteristics of one specific person (e.g., a biological fingerprint), that can be considered to be unique, or absolutely unique, to one specific observed person.

Capture/capturing: the use of cyber resources for acquiring and recording cyber sensor observations.

Characteristic: a recognized aspect, characteristic or feature of or from an observation or an observation subject that can be assigned at least one designation for further utilization.

Characteristics: at least one characteristic.

Complete spectrum: the complete set of possible choices for a given variable or option, which includes the subset of available choices for any given variable or option. Thus, for example, the complete spectrum of cyber resources is the complete set of possible cyber resources, which includes all available cyber resources.

Constant/constantly: occurring at any selected frequency that provides for essentially continuous uninterrupted identity testing of any one specific tested person.

Criteria: a group of options containing at least one member.

Cyber: utilizing non-biological processing of programming. Anything such as devices, programming, processes, or files that utilize non-biological processing of programming in any way.

Cyber Portal: a user interface input/output device that is a component of a Single-Point-of-Access Cyber System or a Point-of-Cyber-Access Cyber System.

Derived data: data that is a result of the processing of sensor data or other derived data.

Designation/designations: one or more informational representations regarding one of more sensor observations or one or more sensor observation subjects.

Determination of identity: (a) determination of previously unknown identity, or (b) verifying or not verifying claimed identity.

Identity determinations: at least one identity test determination regarding any one specific tested person; an identity test may be configured to make at least one identity test determination selected from the group consisting of: (a) determining that one specific tested person is the exact same person as one specific known person, (b) determining any percentage of probability that exists of one specific tested person being the exact same person as one specific known person, or (c) determining that one specific tested person absolutely is not the same person as one specific known person.

Known person: one specific person who is the one specific known subject of at least one first series observation record.

Observation data: data from at least one sensor observation that is utilized by an identity testing machine.

Period of time: any increment of time that is longer than a point in time.

Processing: one or more actions or processes that are made to sensor data or derived data wherein the processing of sensor data or derived data results in the creation of derived data.

Real time: occurring in a period of time that is so short that it is perceived by a person to have occurred without latency.

Recognized: any aspect of an observation or a subject of an observation that has been identified for further utilization.

Selected from: "from" or "selected from". One skilled in the art will appreciate that the expression "x is selected from the group G", where x is a group member variable and G is the group, is legal terminology (Markush language) which is merely intended to specify possible values for x, and which does not by itself suggest or imply an actual selection step in any methodology or system this terminology is being used to describe.

Series: a group of at least one.

Tested person: one specific person who is one specific subject of at least one second series identity test sensor observation; one specific person who has not currently been determined, utilizing predetermined criteria, to be the same person as one specific known person.

Unique: occurring at a selected ratio other than the ratio of absolutely unique.

OVERVIEW

In accordance with the teachings herein, unique cyberspace identity datasets regarding any one specific person and a scalable configurable universal complete spectrum identity testing machine are disclosed. The unique cyberspace identity datasets regarding any one specific person and the identity testing machine may accurately and reliably be utilized to make one or more identity test determinations selected from the spectrum of identity test determinations. The systems and methodologies disclosed herein for providing unique identity test datasets regarding any one specific person and accurate identity test determinations regarding any one specific tested person provide the foundation upon which a secure, safe and private technologically interconnected cyberspace environment or cyberspace ecosystem may be built.

Additionally, through utilization of unique cyberspace identity datasets regarding any one specific person and the accurate or reliable identity testing machine determinations regarding any one specific tested person that are disclosed herein, cyberspace may soon change from an environment of unparalleled chaos to a unified and orderly technologically interconnected environment that is configurable for providing all users with reasonable levels of cybersecurity, cyber safety and cyber privacy.

The following list includes a portion of the resources and features from the spectrum of resources and features that are provided by utilization of unique cyberspace identity datasets regarding any one specific person and the disclosed scalable configurable universal complete spectrum identity testing machine:

a. identity test determinations regarding some or all people from the spectrum of tested people who are subjects of identity test sensor observations;

b. identity test determinations that utilize some or all aspects from the spectrum of aspects of subjects of identity test sensor observations;

c. identity test determinations that fill some or all needs from the spectrum of needs for the utilization of identity test determinations;

d. identity test determinations that are made at one or more selected attainable levels of accuracy including 100% accuracy;

e. identity test determinations that utilize some or all resources from the spectrum of available useful resources;

f. identity test determinations that utilize some or all information from the spectrum of available useful information;

g. identity test determinations that utilize some or all sensor observations from the spectrum of available useful sensor observations;

h. identity test determinations that utilize some or all observable characteristics of one specific person from the spectrum of observable characteristics of the one specific person who is a subject of an identity test sensor observation;

i. identity test determinations that utilize some or all criteria from the spectrum of useful criteria;

j. identity test determinations that utilize standard designations for accurately and reliably representing any aspect of the operations of the identity testing machine;

k. identity test determinations that are: (i) made one single time, (ii) made intermittently, or (iii) made constantly;

l. utilization of identity test determinations for the purpose of accurately granting or denying any one specific tested person access to at least one member selected from the list of: (i) the identity testing machine, (ii) cyber resources that are being utilized by the identity testing machine, or (iii) cyber resources that are utilizing the identity testing machine;

m. enabling security or privacy, which may include absolute security or privacy for some or all cyber resources or activities that are utilizing or being utilized by the identity testing machine;

n. identity test sensor observations of a person where the person as a subject of an observation may be at any one point in a range of, from a person being observable but not being consciously engaged in an identity test sensor observation, to the person being consciously engaged and participating in an identity test sensor observation;

o. scalability in regard to included or utilized necessary resources, wherein an identity testing machine may be specifically configured to include only the resources that are necessary to provide for identity test machine needs for necessary resources at any one point in a range from providing for the smallest of all identity testing machine needs in regard to included or utilized necessary resources, to providing for the largest of all identity testing machine needs in regard to included or utilized necessary resources;

p. ease of use in some or all phases of operations;

q. persistence in attempting to achieve selected attainable identity test determination goals;

r. utilization of one or more sensor-observed visual, physical, behavioral physiological or biological characteristics of one specific person in making of identity test determinations regarding one specific tested person;

s. alteration of operations of the identity testing machine or any resources that are being utilized by the identity testing machine for any purpose including the purpose of aiding in achieving at least one identity test determination goal;

t. utilization of useful information from any source;

u. utilization of a unique combination of simultaneously occurring sensor-observed characteristics of any one specific known person for the purpose of making identity test determinations regarding one specific tested person; or v. utilization of a combination of observed characteristics of any one specific known person that occur over at least one period of time for the purpose of making at least one identity test determination regarding the one specific tested person.

Proper utilization of identity test determinations regarding one specific tested person as disclosed herein, identity test determinations that may be highly accurate, including being 100% accurate, may, for the first time ever, enable the world to enjoy the benefits of a secure, safe, and private technologically interconnected cyberspace environment or cyberspace ecosystem. Among the many benefits that may be derived from the utilization of the identity testing machine disclosed herein is its ability to determine and report on any indicated measure of probability that exists of one specific tested person being the same person as one specific known person. At one end of the spectrum of these identity test determinations is a determination that one specific tested person absolutely is the same person as one specific known person, and at the other end of the spectrum is an identity test determination that the one specific tested person absolutely is not the same person as the one specific known person.

Through the utilization of necessary resources and predetermined criteria, a preferred embodiment of the identity testing machine disclosed herein provides identity test determinations by comparing one specific tested subject of at least one identity test sensor observation with one specific known subject of at least one identity test sensor observation. The identity testing machine utilizes predetermined criteria for every aspect of its operations where criteria are used. The identity testing machine is configurable for providing or utilizing standard designations to represent observations, characteristics or any other aspects of the operations of the identity testing machine.

The scalable configurable universal complete spectrum identity testing machine is configurable: (a) for being utilized for at least one purpose in addition to being utilized as an identity testing machine, (b) for being utilized as one or more types of devices in addition to being utilized as an identity testing machine device, (c) as a single self-contained identity testing machine, (d) to include utilization of more than one interconnected resource, (e) for being utilized as an integral or remote resource of a device or system, (f) for utilizing all or part of the resources of at least one other device or system, (g) as a virtual device or a physical device or a combination thereof, (h) for being a stationary device or a mobile device or a combination thereof, (i) for being utilized by one or more devices that are located in one or more locations, (j) for utilizing resources that are interconnected in any way, or (k) any combination thereof.

FIG. 1 depicts a first particular, non-limiting embodiment of the operations of the scalable configurable universal complete spectrum identity testing machine in accordance with the teachings herein as used for making identity test determinations from the spectrum of identity test determinations. The operations of the identity testing machine depicted herein, which uses necessary cyber resources and predetermined criteria, may commence by utilizing all or any part of a first series observation step 10 performed on one specific known person who is one specific subject of at least one identity test sensor observation. The first series observations step 10 includes capturing at least one first series sensor observation 10a of the one specific known person, recognizing characteristics 10b from the captured sensor observation, and then assigning designations 10c representing the sensor observation and characteristics from the sensor observation of the one specific known person. These designations may be included, as data, as a part of at least one first series observation record 30, which represents the cyberspace identity or identifiers of the one specific known person.

The identity testing machine may further include utilization of all or any part of a second series observation step 20 performed on one specific tested person who is one specific subject of at least one second series sensor observation. The second series observation step 20 includes capturing at least one second series sensor observation 20a of the one specific tested person, recognizing characteristics 20b from the captured sensor observation, and then assigning designations 20c representing the sensor observation and aspects from the one specific tested person. These designations may be included, as data, as a part of at least one second series observation record 40, which represents the cyberspace identity or identifiers of one specific tested person.

The identity testing machine is configurable for interacting with utilized cyber resources to control the operations of those resources for any purpose including: (a) capturing any possible observations, or (b) providing any useful variation of the operation of identity testing machine or any identity testing machine utilized cyber resources.

Any step of the operations of the identity testing machine, or any portion thereof, may be performed in any useable order or sequence.

Operating in any usable order or sequence, and utilizing all or any part of at least one of the following steps, the identity testing machine is configurable for:

a. utilizing useful observations or useful information from any source;

b. determining or utilizing the level of identity testing machine determination accuracy that has been achieved;

c. determining or utilizing a measure of adequacy of available resources;

d. utilizing cyber resources to capture first series observations or second series observations;

e. recognizing useful characteristics from sensor observations;

f. utilizing recognized characteristics from sensor observations;

g. utilizing at least one unique characteristic for making identity test determinations;

h. assigning designations to recognized characteristics;

i. processing observation data from first series observation records or second series observation records, during a processing step 50, the processing of observation data results in the creation of derived data wherein the observation data or the derived data may be utilized in: (i) at least one processing step, (ii) at least one matching step, (iii) at least one comparing step, or (iv) at least one determining step;

j. determining which, or the order in which, observation data or derived data will be utilized for processing, matching, comparing or determining;

k. matching observations and recognized characteristics from second series observation records, during a matching step 60, with corresponding comparable observations and recognized characteristics from first series observation records;

l. determining and providing conclusions as to the indicated measure of comparison between characteristics from second series observation records and characteristics from first series observation records during a comparing step 70;

m. selecting which conclusions from comparing will be utilized in the making of identity test determinations;

n. utilizing (i) observation data, (ii) derived data, (iii) conclusions from comparing, or (iv) useful information, in the making of identity test determinations;

o. making identity test determinations regarding one specific tested person that determine any indicated measure of probability that exists of the one specific tested person and the one specific known person being the same person during a determining step 80; and p. reporting on any aspect of the operations of the identity testing machine during a reporting step 90.

Additionally, based upon predetermined criteria, the identity testing machine may be persistent in attempting to attain a selected identity test determination goal. As an example, should a identity test determination, based upon conclusions from comparing a first characteristic of one specific tested person to one specific comparable characteristic of one specific known person, not result in the identity testing machine achieving a selected identity test determination goal, then the identity testing machine may continue the comparing and determining until the selected identity test determination goal is achieved or there are no further first and second series observation records to compare.

Should an identity test determination that is based upon conclusions from comparing all available useful characteristics of one specific tested person not result in the making of the selected identity test determination goal, then the identity testing machine is configurable for utilizing at least one additional observation of the one specific tested person to add to his or her second series observation records.

The identity testing machine is configurable for selecting a portion of a first series observation record of one specific known person to be repeated by the one specific tested person for inclusion in the one specific tested person's second series observation records.

In order for the identity testing machine to capture observations that are most likely to aid in achieving selected identity test determination goals, the identity testing machine may alter any operational aspect of the identity testing machine or any alterable cyber resource that the identity testing machine is utilizing.

DESCRIPTION

We live in a technologically interconnected world where vast cyber resources presently exist. Within this technologically interconnected world, we utilize cyber resources from the spectrum of available cyber resources. This spectrum is ever widening, and over time, our technologically interconnected world appears to be destined to provide every possible cyber resource that humanity could ever want or need. When that time comes, the entire body of cyber resources will include—and will rely heavily upon—a scalable configurable universal complete spectrum identity testing machine (such as the scalable configurable universal complete spectrum identity testing machine of the present disclosure) that can be configured for constantly making real-time 100% accurate identity test determinations regarding any one specific tested person. In addition, data sets that are utilized by the identity testing machine may also be used in real time or at any time thereafter for making additional determinations regarding the one specific person who was tested.

The core operations of a preferred embodiment of the disclosed identity testing machine may best be understood through a particular, detailed and non-limiting example of the utilization of this identity testing machine for the purpose of accurately making identity test determinations regarding one specific tested person that determine whether or not the one specific tested person and one specific known person absolutely are the same person. One of many predetermined criteria utilized for performing this cycle of the utilization of identity testing machine is that the identity testing machine's full resources should be utilized in any way possible to persistently work towards accomplishing the selected identity test determination goal.

In the following example a "known person" owns an identity testing machine that is additionally configured for being utilized as a laptop computer. The identity testing machine is utilized, in part, for making one-time identity test determinations that are used to exclusively grant only the known person initial access to use of his or her identity testing machine's laptop computer resources. The laptop computer resources utilize the known person's personally configured and built identity test. In addition, the laptop computer-configured identity testing machine includes a microphone and a camera with adjustable operations that the identity testing machine may utilized.

The personalized identity test utilizes data regarding observations of the known person that come from the known person's first series observation records. The first series observation records of the known person are exclusively made up of observations that include the known person as an observation subject. The known person's first series observation records are comprised of data regarding designations from observations. Data from one specific known person's first series observation records make up the cyberspace identity or identifiers for the one specific known person.

A cycle of the utilization of the identity testing machine is initiated by one specific tested person requesting use of the known person's identity testing machine.

Every aspect of the operation of the identity testing machine utilizes predetermined criteria. Criteria may be predetermined by the known person, or criteria may be predetermined as an integral part of the operations of the cyber resources that were selected for use, or criteria may be predetermined as a part of the operations of the identity testing machine, or criteria may be predetermined utilizing any other means for selecting criteria, or any combination thereof. Selection of anything may also constitute selecting criteria.

Criteria are selected choices of who, when, where, what, why, or how as each relates to any aspect of the operations of the identity testing machine. Providing a choice of any possible criteria, and any criteria being possible may well be the most important feature that the family of cyber resources has to offer. The identity testing machine disclosed herein is configurable for taking full and best advantage of this particular cyber feature by providing any user with a choice of selection of available criteria regarding any aspects of his or her utilization of the identity testing machine.

In this cycle of utilization, the identity testing machine uses predetermined criteria and its camera to capture images of the tested person. The identity testing machine utilizes the zoom feature of the camera to closely frame an image of only the face of the tested person in order to provide an observation that would be the most likely observation to aid in achieving a selected identity test determination goal.

As a part of either series of observations the identity testing machine recognizes useful characteristics of any kind from the observations.

The identity testing machine is configurable for providing or utilizing a standard set of designations for accurately and reliably representing any aspect of the identity testing machine or its operations.

Utilization of one, and only one, standard set of designations is an important part of accurately, reliably or consistently making identity test determinations while utilizing any available observation or cyber resources from any place on the planet. This approach also preferably implements a strategy of providing, on a worldwide basis, extremely consistent and accurate assignments of standard designations to every recognized aspect or characteristic of or from each and every identity testing machine observation.

Designations that accurately and reliably represent the observations and observed characteristics including designations representing the captured image of the tested person's face are assigned and then included, as data, in second series observation records of the one specific tested person. In addition, standard designations may be accurately and consistently assigned, according to identity testing machine standards, so that designations representing observations and recognized characteristics from either series of observations may be universally utilized across the entire technologically interconnected cyberspace environment or cyberspace ecosystem where identity testing machines are utilized.

The identity testing machine utilizes predetermined criteria for matching data representing characteristics from the tested person's second series observation records with data representing comparable characteristics from at least one comparable first series observation record of one specific known person.

In this cycle of utilization of the identity testing machine predetermined criteria call for selecting and then utilizing at least one comparable observation record from the first series observation records of the one specific known person. Further, the at least one selected observation record preferably will be the most likely of all available observation records to aid in accurately achieving the selected identity test determination goal.

Through the incredible speed and power of the operations of cyber resources, any large number of criteria may collectively or selectively be utilized for any aspect of the operations of the identity testing machine.

The identity testing machine utilizes parameters such as time, date, temperature, light sources, light levels, the portion of the tested person that was observed, and the clarity of observation for matching the second series observation records of the one specific tested person with at least one comparable first series observation record of the one specific known person who is the proprietary user of the laptop-computer-configured identity testing machine.

The identity testing machine makes final determinations for many aspects of each observation when designations are assigned to recognized characteristics. For example, a determination may be made that one specific person who was one specific subject of a sensor observation had red hair, or hazel eyes, or a particular geometry and ratio of change with the movement of the one specific person's hand, face or head.

When utilizing an observation that has more than one specific person as a subject of the observation, the identity testing machine may exclude from further determinations any person who is one specific subject of an observation who has been determined to not fit certain criteria. For example, in keeping with the previous example, the identity testing machine may exclude from further determinations any person who has been determined to have hair that is not red and eyes that are not hazel. Also, one specific tested person may be determined to absolutely not be the same person as the one specific known person if it was determined that the one specific tested person did not have red hair and hazel eyes.

This cycle of utilization of the cyberspace identity verification test includes at least one processing step, wherein at least one part of the observation data from at least one second series observation of the one specific tested person is processed in at least one way and the processing results in the creation of derived data. The derived data is then used by the identity testing machine during: (a) at least one additional processing step, (b) at least one matching step, (c) at least one comparing step, or (d) at least one determining step. In this cycle of utilization, observation data and derived data are processed and the resulting derived data is regarding changes in one or more sensor observable characteristics of the one specific tested person that occurred over one or more periods of time. The changes that occurred were changes that represent unique visual, physical, behavioral, physiological or biological characteristics of the one specific tested person.

Matched observation records of the one specific tested person and the one specific known person are compared by the identity testing machine.

Conclusions from comparing data from observation records, observation data, derived data or useful information may be utilized in the making of identity test determinations.

As one specific example of use of an identity testing machine, one specific tested person is wearing large dark glasses that prevent the identity testing machine from utilizing any comparison from the entire area of his or her eyes. The one specific tested person is also wearing a hat that covers the area where the tested person has a small scar crossing a pea-sized birthmark. As a result, this unique characteristic cannot be utilized in the making of identity test determinations regarding the one specific tested person.

In this case, the conclusion from comparing a first set of matched characteristics did not enable the identity test determination goal to be attained. Hence, following predetermined criteria, the identity testing machine is configured to continue utilizing conclusions from the comparison of characteristics until the identity test determination goal is attained, or until there are no further conclusions to utilize.

Since the determination goal has not been attained, the identity testing machine selects utilization of a further observation of the tested person's left hand. In this example, the identity testing machine requests that the tested person fully open his or her left hand in the presence of the identity testing machine's camera, with fingernails facing the camera, and that the properly positioned hand be closed and opened again fully.

The tested person, still wanting to gain access, complies with the request that was presented on the identity testing machine's image display screen.

The identity testing machine utilizes comparisons of data that was derived from observation designations regarding the geometry of movement of, and the visual presence of the moving hand and fingers for making this identity test determination.

The selected second series observation record provides an overabundance of visual, physical, behavioral, physiological or biological characteristics that may be utilized in the making of the previously selected identity test determination goal, far more than are needed for determining, with essentially 100% accuracy, that the one specific tested person and the one specific known person absolutely are the same person. In the present example, just a portion of the characteristics that were recognized from the opening and closing of a single finger could have been used to achieve the selected identity test determination goal.

Once the identity test determination goal has been attained, the identity testing machine is configured to record the determination to a history that it maintains, and having determined the that the one specific tested person absolutely is the proprietary user of the identity testing machine, the identity testing machine then grants the known person exclusive access to use of its resources. History, or any other aspect of the operations of the identity testing machine may be stored in volatile or non-volatile memory, e.g., in one or more storage modules that are utilized by one or more computers.

Figure 2:
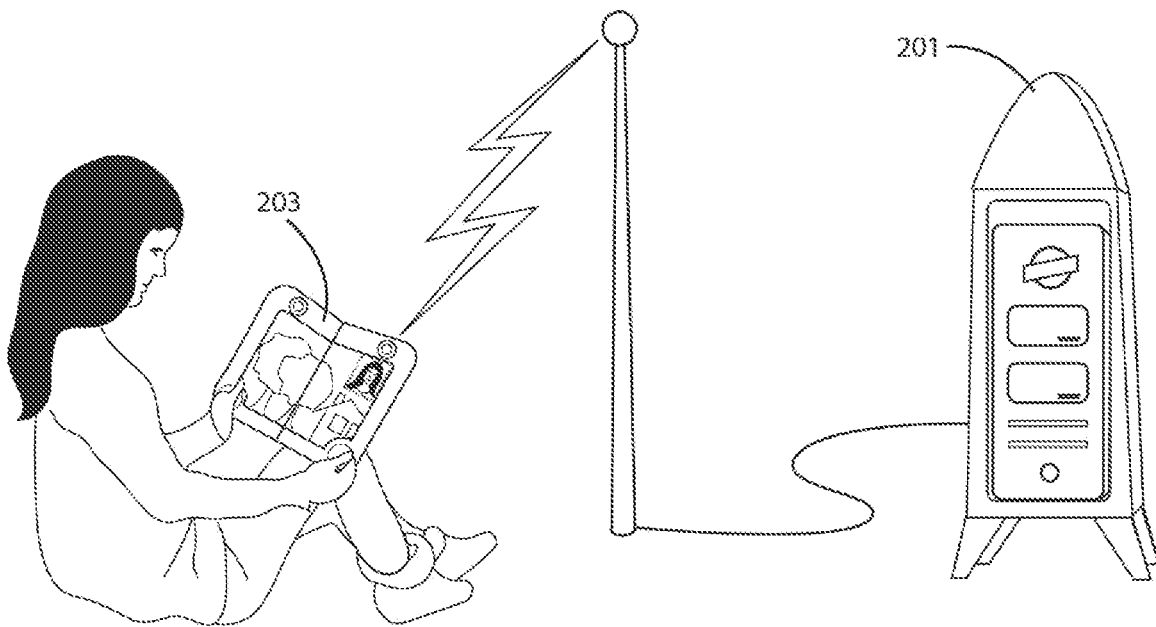
FIG. 2 is an overview diagram of a person utilizing a cyber portal for gaining access to her remotely located identity testing machine. The identity testing machine is configured to additionally be used as a point of cyber access computer and the identity testing machine's identity test determinations are utilized as a prerequisite and an ongoing requirement for one specific tested person to initially gain access, and then continue to have access to the point of cyber access computer and its resources. The point of cyber access computer and the cyber portal are components of the "Single-Point-of-Access Cyber System" described in U.S. Pat. No. 9,479,507 (Aronson) and the "Point-of-Cyber-Access Cyber System" described in U.S. Pat. No. 9,660,996 (Aronson), both of which are incorporated herein by reference in their entirety. This diagram illustrates a particular, non-limiting embodiment of the identity testing machine disclosed herein.

FIG. 2 depicts a particular, non-limiting embodiment of a person utilizing a cyber portal for gaining access to her remotely located point of cyber access computer-configured identity testing machine, wherein identity test are utilized for constantly making determinations regarding one specific tested person's identity. The point of cyber access computer and the cyber portal are components of the "Single-Point-of-Access Cyber System" and the "Point-of-Cyber-Access Cyber System".

Figure 3:
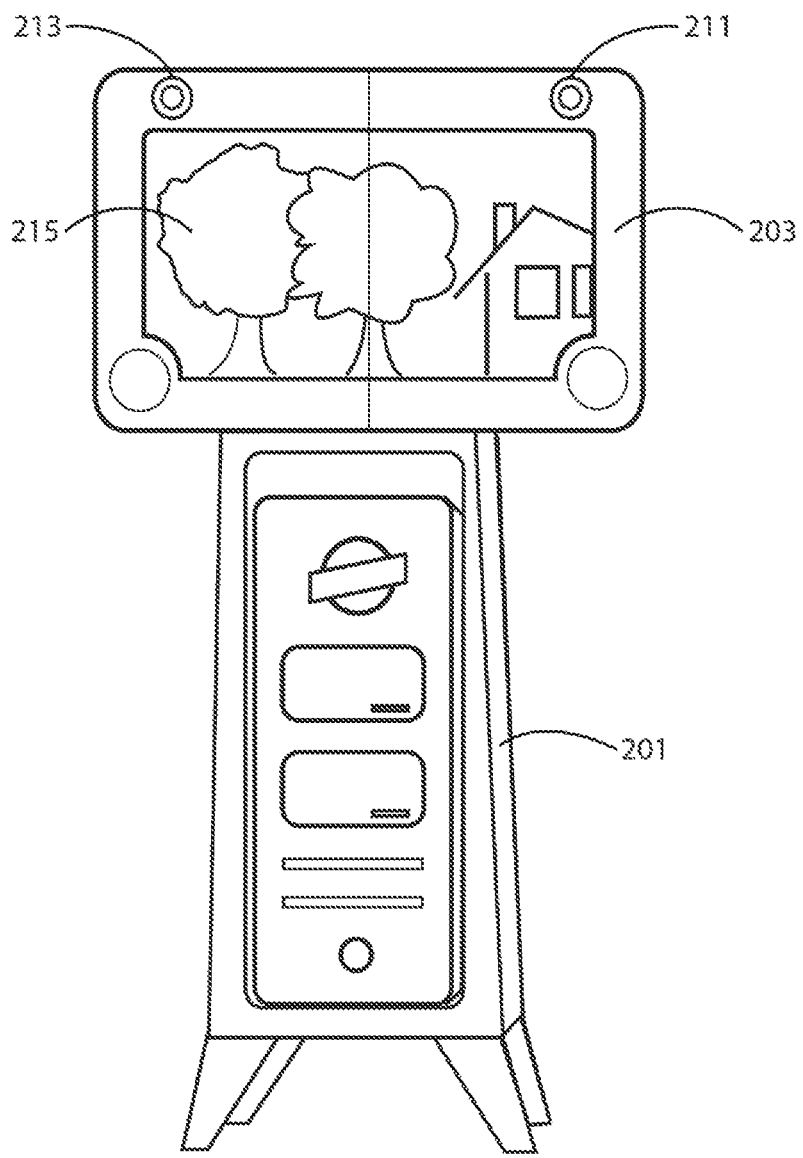
FIG. 3 is an overview diagram of an identity testing machine that is configured as a point of cyber access computer that has an integral cyber portal wherein an identity test is personally configured to be used for testing the identity of the one specific person who is the proprietary user of this specific point of cyber access computer-configured identity testing machine. The identity test determinations are configured to be utilized for continuously determining, with 100% accuracy, whether or not the one specific tested person is the one specific known person who is the proprietary user of this point of cyber access computer-configured identity testing machine. This diagram illustrates one particular, non-limiting embodiment of the identity testing machine disclosed herein.

FIG. 3 depicts a particular, non-limiting embodiment of a point of cyber access computer with an integral cyber portal.

In order to best demonstrate a few selected further utilizations of the systems and methodologies disclosed herein, it is helpful to consider the future, which may be illustrated with reference to the Single-Point-of-Access Cyber System. This is advantageous in that the Single-Point-of-Access Cyber System is a technologically interconnected cyberspace environment or cyberspace ecosystem that may provide for the fullest and best utilization of a scalable configurable universal complete spectrum identity testing machine such as the identity testing machine of this disclosure.

The Single-Point-of-Access Cyber System architecture provides for each person to proprietarily utilize a remotely accessible point of cyber access computer 201. Each person may utilize any mobile or stationary remote terminal-type of user interface device that is called a cyber portal 203 to gain secure and private access to his or her own remotely located point of cyber access computer 201.

An identity testing machine may be configured to be additionally utilized as a person's own remotely located point of cyber access computer. Wherein, the identity testing machine disclosed herein is configurable for making identity test determinations with a high degree of accuracy, up to and including 100% accuracy. In this example, when 100% accuracy has been achieved, the one specific tested person will be determined to absolutely be the same person as the one specific known person who is the proprietary user of the remotely located point of cyber access computer, which must occur before the one specific tested person is granted access to the personal and private resources of his or her own point of cyber access computer. In addition, the one specific known person who is the proprietary user of the point of cyber access computer must also constantly pass his or her identity test in order to maintain continued access to its resources.

Enabled by the identity test determinations of the disclosed identity testing machine, the Single-Point-of-Access Cyber System may be utilized to provide a technologically interconnected world with a cyberspace environment or cyberspace ecosystem that provides the highest attainable levels of cybersecurity, cyber safety and cyber privacy.

A cycle of utilization of the identity testing machine is initiated by a yet-to-be-identified person who utilizes any cyber portal 203 to call up a remotely located point of cyber access computer-configured identity testing machine 201, and then request access to its personal and private resources.

Each person's point of cyber access computer-configured identity testing machine may be configured to where only one specific person, the point of cyber access computer's proprietary user, may gain access to its personal or private resources and only after that one specific person has, with 100% accuracy, been determined to be the proprietary user of the point of cyber access computer. In this instance the identity testing machine requests, through use of the cyber portal's image display screen 215, that the one specific tested person repeat a phrase that has been randomly selected from the first series observation records of the point of cyber access computer's proprietary user.

The identity testing machine may utilize any criteria for selecting the phrase to be repeated. For example, in the instance the phrase to be repeated was selected based upon camera observations from the utilized cyber portal in regard to light levels, light source, pose, camera angle, movement of the one specific tested person, movement of the cyber portal, background noise, and a number of other selected criteria.

The tested person repeats the selected phrase for the microphone 213 and camera 211 of the cyber portal 203. The identity testing machine controls the operations of the microphone 213 and the pan, tilt, and zoom modes of the camera 211 of the cyber portal in order to capture the optimum second series observation of the one specific tested person.

The identity testing machine recognizes characteristics from this observation and accurately assigns standard designations to the recognized characteristics. The designations representing the observation and recognized characteristics are included, as data, in the one specific tested person's second series observation records.

Data representing the designations from the repeating of the selected phrase are then compared, utilizing the predetermined criteria of first matching the peak and valley graph representations of the sound of the voice from the repeating with the peak and valley graph representations of the voice from the one specific known person speaking the phrase that was repeated. Then, if a match exists, the identity testing machine further compares the position of the mouth at various points in time such as, for example, at the points in time when there are high peaks in the peak and valley voice graph.

In this instance the one specific tested person requesting access absolutely is the one specific known person who is the proprietary user of the point of cyber access computer and the proprietary user is thereby granted exclusive initial access to its personal and private resources.

It is best to utilize, environment-wide, criteria that provide a person with secure, safe, and private access to his or her own remote or local computer or other cyberspace resources. To achieve this secure, safe and private cyberspace environment or cyberspace ecosystem, it is desirable to utilize criteria that require an 100% accurate identity test determination be made and passed by one specific tested person before granting that one specific tested person access to his or her own computer or available cyber resources. It is further recommended that criteria be utilized that requires constant continued 100% accurate identity test determinations to be made of the same specific tested person while he or she continues to utilize, in any way, his or her own computer or available cyberspace resources.

The Single-Point-of-Access Cyber System not only requires that a person be accurately determined to be the proprietary user of his or her point of cyber access computer before the person may gain access to its personal or private resources, but the Single-Point-of-Access Cyber System also preferably requires the person utilizing his or her point of cyber access computer be constantly determined to be its proprietary user during the entire period of time that he or she is using its resources in any way.

One example of how the identity testing machine may constantly make cyberspace identity verification test determinations utilizes sequential video images of the face of the one specific person who is the user of the cyber portal. Predetermined criteria call for real time comparison of first series observation data representing aspects or characteristics from sequential images of the one specific person's face with matching data representing comparable aspects or characteristics from first series observations of the proprietary user of the point of cyber access computer. Additionally, for this cycle of utilization of the identity testing machine, predetermined criteria call for 100% accurate identity test determination to constantly be made.

In the event that it is not possible to utilize the prior strategies for making constant determinations of identity of the user of a cyber portal, then the identity testing machine may utilize any possible aspects of sensor observations of the user of the cyber portal to persistently attempt to accomplish 100% accurate identity test determinations that the tested person is the proprietary user of the point of cyber access computer-configured identity testing machine that is performing the testing.

Looking to the present again, and more particularly cyber-security's present need for an easy to use, versatile identity testing machine that can be configured to constantly provide 100% accurate identity test determinations regarding any one specific person, it is clear that prior art's cyber identity testing fails to meet present needs for 100% accurate identity test determinations. This is so because prior art cyber determination of identity do not go so far as to identify each one specific person by utilizing unique visual, physical, behavioral, physiological or biological characteristics of the person that cannot be replicated by any others. The identity testing machine of the present disclosure is configurable for making determinations of identity regarding any one specific tested person by utilizing unique visual, physical, behavioral, physiological or biological characteristics of the person. These characteristics are preferably of a type that cannot be replicated by any other person or device.

The scalable configurable universal complete spectrum identity testing machine as utilized for making essentially 100% accurate identity test determinations regarding any one specific person, preferably utilizes as many unique visual, physical, behavioral, physiological or biological characteristics of a person as are necessary to achieve an attainable selected identity test determination goal. Many examples of characteristics of a person have previously been addressed. When internal and external sensor observations (which may observe visual, physical, behavioral, physiological or biological characteristics) of a person are utilized, there are a very large number of possible unique combinations of characteristics that may be utilized for making identity test determinations regarding any one specific person. With every unique visual, physical, behavioral, physiological or biological characteristic of a person that has been sensor observed exists a means for accurately making identity test determinations by comparing second series observation data of one specific tested person to data from the first series observation records of one specific known person.

Within the spectrum of identity test determinations regarding one specific person are a multitude of identity test determinations that fall short of making a determination that one specific tested person and one specific known person absolutely are the same person. For example, there are determinations of hair color, moles, wrinkles in skin, freckles, geometry of motion at joints, scars, height, eye color, and so forth.

There are also identity test determinations of any measure of probability that exists of one specific tested person and one specific known person being the same person. This type of identity determination is useful in many ways: for example, it may be utilized to provide an indicated measure of probability that has been accomplished at a specific point in an operational cycle of the identity testing machine. Additionally, should there be more than one tested person as a subject of a second series observation, all those who are not the same person as the known person may be eliminated by utilizing an ever increasing selected minimum indicated measure of probability to quickly eliminate all of the observation subjects who are not the one specific known person.

The identity testing machine disclosed herein may be utilized for determining the exact identity of one specific tested person even when there is no knowledge of who the tested person might be other than the data representing second series observations designations regarding the one specific tested person. For example, the identity testing machine may determine who one specific tested person is by utilizing selected criteria that call for the most unique combination of recognized characteristics of the tested person be utilized for searching available databases of first series observation records of known people. This search may continue until either one specific known person is found that absolutely is the same person as the one specific tested person, or there are no further first series observation records of comparable known people from which to search and compare.

The identity testing machine disclosed herein may also utilize useful information from any source for making identity test determinations. Perhaps the most useful of all information that could be utilized by the identity testing machine when making determinations regarding the identity of any one specific person would be information as to exactly who the one specific tested person is. If the information that the identity testing machine utilizes is accurate, then comparison of only one specific person's first series observation records to the second series observation records of the one specific tested person will provide verification of the reported identity of the tested person.

Prior art cybersecurity measures fail to reliably control access to cyber resources because of their inability to accurately determine the exact identity of any one specific person who is utilizing those cyber resources. The systems and methodologies of the present disclosure are configurable for making any identity test determinations selected from the spectrum of identity test determinations regarding people who are subjects of identity test sensor observations. This includes determinations regarding whether or not one specific known person and one specific tested person are the same person. At one farthest end of this range is the determination that the one specific tested person and the one specific known person absolutely are the same person. This determination of identity may be utilized to accurately grant only the one specific known person access to his or her own personal or private cyber resources. Since the disclosed identity testing machine is configurable for utilizing unique visual, physical, behavioral, physiological or biological characteristics of the one specific known person that can never be replicated by others, then all others may be accurately excluded from ever gaining access to the cyber resources of the one specific known person.

One of the greatest concerns of those who are skilled in the art of making easy to use, visual, physical, behavioral, physiological or biological-based determinations of identity of a person is that the utilized information that makes up the cyberspace identity or identifiers of any one specific person may be stolen and then used fraudulently or maliciously. The identity testing machine of this disclosure is configurable for making identity test determinations regarding any one specific person, preferably by utilizing unique visual, physical, behavioral, physiological or biological characteristics of the one specific person that can never be replicated by others. In many instances, a unique combination of a number of visual, physical, behavioral, physiological or biological characteristics of one specific person that are observed simultaneously or over one or more periods of time may be utilized for accurately or reliably making identity test determinations.

Once again, looking to the future of humanity's use of cyber resources, there may come a time when humanity responsibly utilizes cyber resources as a tool to regularly augment each person's own natural cognitive and observational capabilities.

In order for any one person to achieve the highest attainable levels of benefits from utilization of cyber resources for augmenting his or her own natural cognitive and observational capabilities, it is desirable to first provide the person with a relationship of access to utilized cyber resources that is almost identical to the relationship of access the person has with his or her own mind and senses.

Therefore, it is desirable that personal and private cyber information and resources be configured to where they can, through use of the disclosed identity testing machine, only be accessed by that one specific person. As an example, a person may not want to be hypnotized for the purpose of others using information from the privacy of the person's mind for any reason. The person may also not want any others to gain access to his or her own personal and private cyberspace resources and information, including health records, financial information, geographical locating reports, cyberspace communications of all kinds, and cyberspace interactions of all kinds (including for commerce, education, entertainment, self-help, and so forth). Similarly, a person may not want any others to gain access to all or any part of the person's private cyber resources and information post mortem, just as it is with the person's own natural cognitive resources.

Through use of the disclosed identity testing machine and a point of cyber access computer, it may be possible, as it also is with a person's own natural capabilities, to share any selected portion of the person's own personal and private cyber information or resources with selected others.

Invention is the process of merging the future with the present.

Welcome to the future.

One skilled in the art will appreciate that some of the methodologies disclosed herein may be implemented utilizing one or more software programs. Such software programs may take the form of suitable programming instructions disposed in a tangible, non-transient medium which, when implemented by one or more computer processors, perform part or all of the methodologies described herein.

While the disclosed scalable configurable universal complete spectrum cyberspace identity verification test has been defined in terms of its preferred and alternative embodiments, those of ordinary skill in the art will understand that numerous other embodiments and applications of the disclosed cyberspace identity verification test will become apparent. Such other embodiments and applications shall be included within the scope and meaning of the disclosure as defined by the appended claims. Moreover, it is to be understood that the above description of the present disclosure is illustrative, and is not intended to be limiting. It will thus be appreciated that various additions, substitutions and modifications may be made to the above described embodiments without departing from the scope of the present disclosure. Accordingly, the scope of the present disclosure should be construed in reference to the appended claims.

What is claimed is:

1. A scalable configurable universal complete spectrum identity testing machine, said identity testing machine comprising at least one computing device, wherein said at least one computing device utilizes
    (a) at least one sensor observation,
    (b) criteria selected from a spectrum of criteria that may be utilized by said identity testing machine,
    (c) selected useful information,
    (d) selected necessary programming, and
    (e) any other necessary resources,
    all of which are configured and utilized for a making of at least one identity test determinations regarding any one specific tested person;
    wherein said identity testing machine utilizes at least a portion of resources of said at least one computing device;
    wherein said identity testing machine is configurable and may be configured for utilization in at least one configuration;
    wherein said identity testing machine's identity tests are selected from a spectrum of identity tests that utilize sensor observations of a person in a making of determinations regarding an identity of any one specific tested person;

wherein said any one specific tested person is selected from a spectrum of people who have been tested;

wherein said any other necessary resources are selected from a spectrum of other resources that may be necessary for said identity testing machine to utilize;

wherein said identity testing machine is utilizable under at least one observation circumstance selected from a spectrum of sensor observation circumstances;

wherein said identity testing machine is utilized for at least one purpose selected from a spectrum of purposes for which identity testing machines may be utilized;

wherein said necessary programming is selected from a spectrum of programming that may be necessary for said identity testing machine to utilize;

wherein said identity testing machine utilizes useful information from at least one point in time or from over at least one period of time;

wherein said useful information is selected from a spectrum of information that may be utilized by said identity testing machine;

wherein said spectrum of useful information includes information that was from, or was derived from, at least one sensor observation;

wherein said at least one sensor observation provides useful information regarding at least one aspect of (a) at least one sensor observation, (b) at least one specific known person, or (c) at least one specific tested person;

wherein at least one identity test determination regarding one specific tested person is selected from a spectrum of identity test determinations regarding any one specific tested person;

wherein said any one specific tested person is one specific subject of at least one identity test sensor observation;

wherein at least one aspect of one specific known person or one specific tested person is selected from a spectrum of sensor observable aspects of people;

wherein said identity testing machine utilizes at least one observed characteristic regarding said at least one aspect of said one specific known person, or said one specific tested person in a making of at least one identity test determination;

wherein said at least one observed characteristic is selected from a spectrum of sensor observable characteristics of people who are subjects of identity test sensor observations;

wherein said identity testing machine is configurable for utilizing at least one type of sensor observation selected from the group consisting of (a) visual sensor observations, (b) audible sensor observations, (c) thermal sensor observations, (d) olfactory sensor observations, (e) tactile sensor observations, (f) chemical sensor observations, or (g) any other types of sensor observations that may be utilized by said identity testing machine;

wherein said least one sensor observation has at least one characteristic that is utilizable by said identity testing machine;

wherein said at least one characteristic is selected from a spectrum of characteristics of sensor observations that may be utilized by said identity testing machine;

wherein said identity testing machine is scalable in regard to included or utilized resources, wherein its included or utilized resources fall at one point in a range of from a minimum to a maximum;

wherein at a minimum said identity testing machine includes or utilizes only resources that are necessary for providing for a least complex, in regard to included or utilized resources, of all identity testing machine needs for included or utilized resources; and at a maximum said identity testing machine test includes or utilizes all necessary resources for providing for a making of a most complex, in regard to included or utilized resources, of all identity testing machine needs for included or utilized resources;

wherein said identity testing machine is configurable for determining or utilizing at least one measure of adequacy of available resources;

wherein said identity testing machine is configurable for determining or utilizing at least one measure of adequacy of available useful information;

wherein said identity testing machine is configurable for determining or utilizing at least one measure of accuracy of at least one identity test determination;

wherein said identity testing machine is configurable for making at least one type of identity test determinations selected from the group consisting of (a) identity test determinations that are made as single events, (b) intermittently made identity test determinations, and (c) constantly made identity test determinations, regarding any one specific tested person;

wherein said identity testing machine is configurable for testing an identity of any one specific tested person in real time or at any time thereafter; or wherein said identity testing machine is further configurable for utilizing at least one part of at least one step selected from the group consisting of (a) a first series observation step, wherein said identity testing machine utilizes at least one sensor observation, wherein one specific known person is one specific subject of said at least one sensor observation, wherein said one specific known person has at least one specific sensor observable aspect, wherein said identity testing machine recognizes at least one characteristic regarding said at least one specific aspect, wherein said at least one recognized characteristic is utilizable by said identity testing machine in a making of at least one identity test determination regarding said one specific known person, wherein said identity testing machine utilizes at least one designation from said at least one sensor observation or assigns at least one designation representing (i) said at least one sensor observation, (ii) said at least one sensor observed aspect of said one specific known person, or (iii) said at least one sensor observed characteristic regarding at least one observed aspect, wherein said identity testing machine includes said at least one designation, as data, in at least one first series observation record of said one specific known person, (b) a second series observation step, wherein said identity testing machine utilizes at least one sensor observation, wherein one specific tested person is one specific subject of said at least one sensor observation, wherein said one specific tested person has at least one specific sensor observable aspect, wherein said identity testing machine recognizes at least one characteristic regarding said at least one specific aspect, wherein said at least one recognized characteristic is utilizable by said identity testing machine in a making of at least one identity test determination regarding said one specific tested person, wherein said identity testing machine utilizes at least one designation from said at least one sensor observation or assigns at least one designation representing
  (i) said at least one sensor observation,
  (ii) said at least one sensor observed aspect of said one specific tested person, or
  (iii) said at least one characteristic regarding said at least one sensor observed aspect,
wherein said identity testing machine includes at least one designation, as data, in at least one second series observation record of said one specific tested person,
(c) a processing step, wherein at least one designation from said at least one first series observation record or at least one designation from said at least one second series observation record are stored or utilized as data,
wherein at least part of said data from said at least one first series observation step or said at least one second series observation step is processed utilizing at least one method, process, procedure or formula,
wherein said at least one method, process, procedure or formula is selected from a spectrum of methods, processes, procedures or formulas that may be utilized in a processing of data from first series observation steps or second series observation steps,
wherein a processing of said observation data or derived data results in the creation of derived data,
wherein said observation data or said derived data is utilizable for at least one purpose selected from a spectrum of purposes for which said observation data or said derived data may be utilized by said identity testing machine,
wherein said at least one purpose includes utilizing said observation data or said derived data in a making of at least one identity test determination regarding any one specific tested person,
wherein at least one part of said observation data or said derived data is utilizable by said identity testing machine in at least one part of at least one step selected from the group consisting of
  (i) at least one processing step,
  (ii) at least one matching step,
  (iii) at least one comparing step, or
  (iv) at least one determining step,
(d) a matching step, wherein said identity testing machine matches said observation data or said derived data from at least one second series observation record of one specific tested person with comparable observation data or derived data from at least one first series observation record of one specific known person,
(e) a comparing step, wherein said identity testing machine compares observation data or derived data from at least one second series observation record of one specific tested person with comparable observation data or derived data from at least one first series observation record of one specific known person and provides at least one conclusion from the comparing,
(f) a determining step, wherein said identity testing machine utilizes at least one member selected from the group consisting of
  (i) at least one part of said at least one conclusion from said at least one comparing step,
  (ii) at least one part of said observation data,
  (iii) at least one part of said derived data, or
  (iv) selected useful information, in the making of said at least one identity test determination, and (g) a reporting step, wherein said identity testing machine provides at least one report regarding at least one part of at least one cycle of utilization of said identity testing machine.

2. The identity testing machine of claim 1, wherein at least one part of said observation data or said derived data from at least one first series observation record of one specific known person is utilized as said one specific known person's cyberspace identity or identifiers;
  wherein said one specific known person's cyberspace identity or identifiers are unique to said one specific known person; and
  wherein at least one part of said observation data or said derived data from at least one first series observation record for any other one specific known person is utilizable as the cyberspace identity or identifiers for said any other one specific known person and said cyberspace identity or identifiers are unique to each one specific other known person.

3. The identity testing machine of claim 1, wherein said identity testing machine achieves at least one selected attainable percentage of accuracy goal for at least one identity test determination; and
  wherein said at least one attainable percentage of accuracy goal falls within a range extending from 0% accuracy up to, and including, 100% accuracy.

4. The identity testing machine of claim 1, wherein said identity testing machine is utilizable at any possible level of observation participation by any one specific tested person or any one specific known person;
  wherein said any one specific tested person or said any one specific known person being one specific identity test sensor observation subject of said identity testing machine; and
  wherein said any possible level of observation participation ranges from said one specific tested person or said one specific known person being sensor observable but not being consciously or otherwise engaged in at least one identity test sensor observation, to said one specific tested person or said one specific known person being an active and consciously engaged participant in at least one identity test sensor observation.

5. The identity testing machine of claim 1, wherein said at least one sensor observation occurs over at least one period of time and said at least one sensor observation includes at least one observed change that occurs over said at least one period of time to at least one member selected from the group consisting of: (a) at least one observable aspect of said sensor observation, (b) at least one observable aspect of any one specific known person who is one specific first series observation subject, or (c) at least one observable aspect of any one specific tested person who is one specific second series observation subject;
  wherein said identity testing machine is configurable for utilizing said at least one observed change that occur over said at least one period of time in the making of at least one identity test determination.

6. The identity testing machine of claim 5, wherein said at least one observed change that occurs over said at least one period of time includes at least one change to at least one aspect of at least one feature of one specific person; and
  wherein said at least one feature of said one specific person is selected from the group consisting of said one specific person's: head, face, mouth, eyes, eyebrows, nose, arms, hands, fingers, legs, feet, neck, torso, skin, heart, stomach, intestines, liver, kidneys, lungs, respiration, breath, vascular system, brain, spinal cord, neural system, skeleton, blood, or any other feature of any one specific person selected from a spectrum of features of a people where sensor observable changes occur over time.

7. The identity testing machine of claim 1, wherein all or part of said observation data or said derived data from said at least one first series observation record of said one specific known person or said at least one second series observation record of said one specific tested person are included as a part of said spectrum of useful information.

8. The cyberspace identity verification test of claim 1, wherein at least one identity test determination includes at least one determination of any indicated percentage of probability that exists of one specific tested person being a same person as one specific known person;
wherein said at least one identity test determination ranges from determining that a 0% probability exists of said one specific tested person being said one specific known person, through determining any intermediate indicated percentage of probability that exists of said one specific tested person being said one specific known person, to determining there is a 100% probability that said one specific tested person absolutely is said one specific known person.

9. The identity testing machine of claim 1, wherein said identity testing machine further includes a repeating step;
wherein said identity testing machine selects at least one part of at least one first series observation of one specific known person for repetition by one specific tested subject of at least one identity test sensor observation;
wherein said one specific tested subject of said identity test sensor observation is sensor observed performing said at least one repetition;
wherein said identity testing machine utilizes at least one designation from the repetition observation or assigns at least one designation representing: (a) said at least one sensor observation, (b) said at least one repetition, (c) at least one observable aspect of said one specific tested subject, or (d) at least one characteristic regarding said at least one sensor-observable aspect of said one specific tested subject; and
wherein said identity testing machine includes the at least one designation in at least one second series observation record of said repetition.

10. The identity testing machine of claim 1, wherein said identity testing machine is further configured for searching and utilizing available first series observation records of at least one specific known person until either every selected identity testing machine determination for the one specific tested person has been completed, or there are no further comparable first series observation records to search or utilize.

11. The identity testing machine of claim 1, wherein said identity testing machine utilizes useful information from at least one source other than at least one member selected from the group consisting of (a) at least one first series observation record of any one specific known person, and (b) at least one second series observation record of any one specific tested person.

12. The identity testing machine of claim 1, wherein said identity testing machine, utilizes said selected criteria, said selected useful information, said selected programming, and said any other necessary resources for the purpose of making identity test determinations that are utilized, at least in part, to determine whether to grant, or to deny, one specific tested person, who is the one specific tested subject of at least one identity test sensor observation, access to at least one part of at least one resource selected from the group consisting of (a) said identity testing machine, (b) at least one resource that is being utilized by said identity testing machine, and (c) at least one resource that is utilizing said identity testing machine.

13. The identity testing machine of claim 1, wherein said identity testing machine manipulates at least one operation of at least one member selected from the group consisting of (a) resources that are being utilized by said identity testing machine, and (b) said identity testing machine itself;
wherein said manipulating provides said identity testing machine with selection of possible utilizations;
wherein said manipulating is utilized for at least one purpose;
wherein said at least one purpose for utilizing said manipulating includes aiding in achieving at least one selected identity test determination goal.

14. The identity testing machine of claim 1, wherein said identity testing machine further includes identity testing machine history, and wherein said history includes at least one history record of or from the operations of said identity testing machine.

15. The identity testing machine of claim 1, wherein at least one part of at least one observation record for one specific known person that was derived from at least one source other than at least one first series observation step is included as at least one part of at least one first series observation record for said one specific known person.

16. The identity testing machine of claim 1, wherein at least one part of at least one observation record for one specific tested person that was derived from at least one source other than at least one second series observation step is included as at least one part of at least one second series observation record for said one specific tested person.

17. The identity testing machine of claim 1, wherein the operations of said identity testing machine, or any part thereof, are performed in any useable order.

18. The identity testing machine of claim 1, wherein said identity testing machine includes at least one standard identity testing machine designation representing at least one part of at least one aspect of at least one operation of said identity testing machine.

19. The identity testing machine of claim 1, wherein said identity testing machine is configurable as at least one member selected from the list consisting of (a) for being utilized for at least one purpose in addition to being utilized as an identity testing machine, (b) for being utilized as one or more types of devices in addition to being utilized as an identity testing machine device, (c) as a single self-contained identity testing machine, (d) to include utilization of more than one interconnected resource, (e) for being utilized as an integral or remote resource of a device or system, (f) for utilizing all or part of the resources of at least one other device or system, (g) as a virtual device or a physical device or a combination thereof, (h) for being a stationary device or a mobile device or a combination thereof, (i) for being utilized by one or more devices that are located in one or more locations, (j) for utilizing resources that are interconnected in any way, and (k) any combination thereof.

20. A scalable, configurable, universal, complete spectrum identity testing machine, wherein said identity testing machine is comprised of at least one computing device and said at least one computing device utilizes criteria that may be utilized by said identity testing machine, selected useful information, and any necessary programming or resources in a making of at least one identity test determination;

wherein said identity testing machine utilizes all or part of the resources of said at least one computing device;

wherein said at least one computing device is configurable for being utilized for at least one purpose in addition to being utilized as an identity testing machine;

wherein said at least one additional purpose is selected from a spectrum of additional purposes for which computing devices of identity testing machines may be utilized;

wherein said identity testing machine makes identity test determination selected from the group consisting of (i) one-time single event identity test determinations, (ii) intermittently made identity test determinations, and (iii) constantly made identity test determinations;

wherein said identity testing machine utilizes useful information from at least one point in time or from over at least one period of time;

wherein said useful information is from a spectrum of information that includes at least one observed characteristic of one specific person who is one specific subject of at least one identity test sensor observation;

wherein said at least one identity test sensor observation is a type of sensor observation selected from the group consisting of (a) visual sensor observations, (b) audible sensor observations, (c) thermal sensor observations, (d) olfactory sensor observations, (e) tactile sensor observations, (f) chemical sensor observations, and (g) any other type of sensor observations that may be utilized be said identity testing machine;

wherein at least one identity test determination is utilized for at least one purpose selected from a spectrum of purposes for which identity test determinations may be utilized;

wherein said identity testing machine is further comprised of utilizing at least one part of at least one step selected from the group consisting of (a) a first series observation step utilizing at least one sensor observation, wherein at least specific known person who is one specific subject of said at least one sensor observation has at least one sensor observable aspect, wherein said identity testing machine recognizes at least one characteristic regarding at least one observed aspect, wherein said at least one recognized characteristic is utilizable by said identity testing machine in the making of at least one identity test determination, wherein said identity testing machine utilizes at least one designation from said at least one sensor observation or assigns at least one designation representing at least one member selected from the group consisting of
(i) said at least one sensor observation,
(ii) said at least one observed aspect of said one specific known person, or
(iii) said at least one recognized characteristic, wherein said identity testing machine includes at least one of said designations, as data, in at least one first series observation record of said one specific known person, (b) a second series observation step utilizing at least one sensor observation, wherein one specific tested person who is one specific tested subject of at least one sensor observation has at least one sensor observable aspect, wherein said identity testing machine recognizes at least one characteristic regarding at least one observed aspect, wherein said at least one recognized characteristic is utilizable by said identity testing machine in the making of at least one identity test determination, wherein said identity testing machine utilizes at least one designation from said at least one sensor observation or assigns at least one designation representing
(i) said at least one sensor observation,
(ii) the at least one observed aspect regarding said one specific tested person, or
(iii) said at least one characteristic regarding said at least one aspect, wherein said identity testing machine includes at least one of said designations, as data, in at least one second series observation record of said one specific tested person, (c) a processing step, wherein at least one designation from said at least one first series observation record or at least one designation from said at least one second series observation record are stored or utilized as observation data, wherein at least one part of said observation data or at least one part of any derived data may be processed in at least one way, wherein said at least one way is selected from the spectrum of ways that observation data or derived data may be processed for utilization by said identity testing machine, wherein said processing of said observation data or said derived data results in the creation of derived data, wherein said observation data or said derived data are utilizable for at least one purpose selected from the spectrum of purposes that said observation data or said derived data may be utilized, wherein said at least one purpose includes being utilized by said identity testing machine in the making of at least one identity test determination, wherein at least one part of said observation data or said derived data are included as at least one part of said useful information, and wherein at least one part of said observation data or said derived data is utilized by said identity testing machine during at least one part of at least one step selected from the group consisting of
(i) at least one processing step,
(ii) at least one matching step,
(iii) at least one comparing step, or
(iv) at least one determining step, (d) a matching step matching observation data or derived data regarding one specific tested person who is one specific tested subject of at least one second series observation with comparable observation data or derived data from at least one first series observation record of one specific known person, (e) a comparing step comparing observation data or derived data from at least one second series observation record of one specific tested person with observation data or derived data from at least one comparable first series observation record of one specific known person, and providing at least one conclusion from said comparing, (f) a determining step, wherein said identity testing machine utilizes at least one member selected from the group consisting of
(i) said at least one conclusion from said at least one comparing step,
(ii) said observation data or said derived data from said first series observation records of one specific known person and said observation data or said derived data from said second series observation records of said one specific tested person, or (iii) said useful information, in the making of said at least one identity test determination, and (g) a reporting step making at least one selected report regarding or utilizing at least one part of at least one cycle of utilization of said identity testing machine.

21. A machine for performing at least one identity test on at least one person who is at least one subject of at least one identity test sensor observation, the identity testing machine is comprised of at least one computing device, said at least one computing device utilizes (a) at least one sensor, (b) criteria selected from a spectrum of criteria that may be utilized by said identity testing machine, (c) selected useful information, (d) selected necessary programming, and (e) any other necessary resource, all of which are configured and utilized for performing of at least one identity test on at least one tested person who is a subject of a second series identity test sensor observation;

wherein said identity testing machine utilizes all or part of the resources of said at least one computing device;

wherein said identity testing machine is configurable for utilizing the at least one computing device for at least one purpose in addition to the purpose of utilizing said at least one computing device as an identity testing machine;

wherein said at least one additional purpose is selected from a spectrum of additional purposes for which computing devices of identity testing machines may be utilized;

wherein said at least one identity test is selected from a spectrum of identity tests that use sensor observations in a making of identity test determinations regarding any one specific tested person;

wherein the at least one specific tested person is selected from the group consisting of a spectrum of people who are subjects of identity test sensor observations;

wherein said any other necessary resources are selected from a spectrum of other resources that may be necessary for said identity testing machine to utilize;

wherein said identity testing machine is utilizable under at least one identity test circumstance selected from a spectrum of identity test circumstances;

wherein said identity testing machine is utilizable for at least one purpose selected from a spectrum of purposes for which identity testing machines may be utilized;

wherein said necessary programming is selected from a spectrum of programming that may be necessary for the identity testing machine to utilize;

wherein said identity testing machine utilizes useful information from at least one point in time or from over at least one period of time;

wherein said useful information is selected from a spectrum of information that may be utilized by said identity testing machine;

wherein said spectrum of useful information includes information that was from, or was derived from, at least one sensor observation;

wherein said at least one sensor observation provides useful information regarding at least one aspect of (a) said at least one sensor observation, (b) one specific known person, or (c) one specific tested person;

wherein said one specific known person or said one specific tested person are each one specific subject of at least one identity test sensor observation;

wherein at least one identity test determination regarding one specific tested person is selected from a spectrum of identity test determinations regarding any one specific tested person;

wherein said at least one aspect of said one specific known person or said one specific tested person is selected from a spectrum of sensor observable aspects of people who are subjects of identity test sensor observations;

wherein said identity testing machine utilizes at least one observed characteristic of said at least one aspect of said one specific known person, or said one specific tested person in a making of at least one identity test determination;

wherein said at least one observed characteristic is selected from a spectrum of sensor observable characteristics of people who are subjects of identity test sensor observations;

wherein said identity testing machine utilizes at least one type of sensor observation selected from the group consisting of (a) visual sensor observations, (b) audible sensor observations, (c) thermal sensor observations, (d) olfactory sensor observations, (e) tactile sensor observations, (f) chemical sensor observations, and (g) any other types of sensor observations that may be utilized by said identity testing machine;

wherein at least one sensor observation has at least one characteristic that is utilizable by said identity testing machine;

wherein said at least one characteristic is selected from a spectrum of characteristics of sensor observations that may be utilized by said identity testing machine;

wherein said identity testing machine is scalable in regard to included necessary resources;

wherein said identity testing machine's included necessary resources fall at one point in a range of from a minimum to a maximum;

wherein at a minimum said identity testing machine includes only the resources that are necessary for providing for a least complex, in regard to included necessary resources, of all identity testing machine needs for resources; and wherein at a maximum said identity testing machine includes all of the resources that are needed to provide for a most complex, in regard to included necessary resources, of all identity testing machine needs for resources;

wherein said identity testing machine is configurable for determining or utilizing at least one measure of adequacy of available resources;

wherein said identity testing machine is configurable for determining or utilizing at least one measure of adequacy of available useful information;

wherein said identity testing machine is configurable for determining or utilizing at least one measure of accuracy for at least one identity test determination;

wherein said identity testing machine makes at least one type of identity test determination selected from the group consisting of (a) one-time single event identity test determinations, (b) intermittently made identity test determinations, and (c) constantly made identity test determinations, regarding any one specific tested person;

wherein said identity testing machine is configurable for testing or verifying an identity of any one specific tested person in real time or at any time thereafter; and wherein said identity testing machine is further configured for utilizing at least one part of at least one step selected from the group consisting of
(a) a first series observation step, wherein said identity testing machine utilizes at least one sensor observation,
wherein one specific known person is one specific subject of said at least one sensor observation,
wherein said one specific known person has at least one specific sensor observable aspect,
wherein said identity testing machine recognizes at least one characteristic regarding said at least one specific aspect,
wherein said at least one recognized characteristic is utilizable by said identity testing machine in a making of at least one identity test determination regarding said one specific known person,
wherein said identity testing machine utilizes at least one designation from said at least one sensor observation or assigns at least one designation representing
  (i) said at least one sensor observation,
  (ii) said at least one sensor observed aspect of said one specific known person, or
  (iii) said at least one sensor observed characteristic regarding said at least one specific observed aspect,
wherein said identity testing machine includes said at least one designation, as data, in at least one first series observation record of said one specific known person,
(b) a second series observation step, wherein said identity testing machine utilizes at least one sensor observation,
wherein one specific tested person is one specific subject of said at least one sensor observation,
wherein said one specific tested person has at least one specific sensor observable aspect,
wherein said identity testing machine recognizes at least one characteristic regarding said at least one specific aspect,
wherein said at least one recognized characteristic is utilizable by said identity testing machine in a making of at least one identity test determination regarding said one specific tested person,
wherein said identity testing machine utilizes at least one designation from said at least one sensor observation or assigns at least one designation representing
  (i) said at least one sensor observation,
  (ii) said at least one sensor observed aspect of said one specific tested person, or
  (iii) said at least one characteristic regarding said at least one sensor observed aspect,
wherein said identity testing machine includes said at least one designation, as data, in at least one second series observation record of said one specific tested person,
(c) a processing step, wherein derived data or at least one part of said data representing at least one designation from said at least one first series observation step or said at least one second series observation step is processed in at least one way,
wherein said at least one way is selected from a spectrum of ways said derived data or observation data from said first series observation steps or said second series observation steps may be processed for utilization by said identity testing machine,
wherein the processing of said observation data or said derived data results in a creation of derived data,
wherein said observation data or said derived data is utilizable for at least one purpose selected from a spectrum of purposes that said observation data or said derived data may be utilized by said identity testing machine,
wherein said at least one purpose includes utilization of said observation data or said derived data by said identity testing machine in a making of at least one identity test determination regarding any one specific tested person,
wherein at least one part of said observation data or said derived data may be utilized by said identity testing machine in at least one part of at least one step selected from the group consisting of
  (i) at least one processing step,
  (ii) at least one matching step,
  (iii) at least one comparing step, and
  (iv) at least one determining step,
(d) a matching step, wherein said identity testing machine matches said observation data or said derived data from at least one second series observation record of one specific tested person with comparable observation data or derived data from at least one first series observation record of one specific known person,
(e) a comparing step, wherein said identity testing machine compares observation data or derived data from at least one second series observation record of one specific tested person with comparable observation data or derived data from at least one first series observation record of one specific known person and provides at least one conclusion from the comparing,
(f) a determining step, wherein said identity testing machine utilizes at least one member selected from the group consisting of
  (i) at least one part of said at least one conclusion from said at least one comparing step,
  (ii) at least one part of said observation data,
  (iii) at least one part of said derived data, or
  (iv) selected useful information,
in the making of said at least one identity test determination, and
(g) a reporting step, wherein said identity testing machine makes at least one report regarding at least one part of at least one cycle of utilization of said identity testing machine.

* * * * *